United States Patent [19]

Shinjo et al.

[11] Patent Number: 5,424,004
[45] Date of Patent: Jun. 13, 1995

[54] CHIRAL SMECTIC LIQUID CRYSTAL COMPOSITION, LIQUID CRYSTAL DEVICE, DISPLAY APPARATUS AND DISPLAY METHOD

[75] Inventors: Kenji Shinjo, Atsugi; Hiroyuki Kitayama, Hiratsuka; Toshiharu Uchimi, Sendai; Syuji Yamada, Atsugi; Kazuharu Katagiri, Tama, all of Japan

[73] Assignee: Canon Kabushiki Kaisha, Tokyo, Japan

[21] Appl. No.: 45,312

[22] Filed: Apr. 13, 1993

Related U.S. Application Data

[63] Continuation of Ser. No. 695,596, May 3, 1991, abandoned.

[30] Foreign Application Priority Data

May 9, 1990 [JP] Japan ................. 2-117496

[51] Int. Cl.$^6$ ............ C09K 19/34; G02F 1/13
[52] U.S. Cl. ................. 252/299.61; 359/104; 359/75
[58] Field of Search ............ 252/299.61; 359/104

[56] References Cited

U.S. PATENT DOCUMENTS

| | | | |
|---|---|---|---|
| 4,581,155 | 4/1986 | Goto et al. | 252/299.61 |
| 4,684,476 | 8/1987 | Kitano et al. | 252/299.61 |
| 4,756,847 | 7/1988 | Yoshida et al. | 252/299.61 |
| 4,776,973 | 10/1988 | Bofinger et al. | 252/299.61 |
| 4,776,975 | 10/1988 | Sawada et al. | 252/299.61 |
| 4,820,839 | 4/1989 | Krause et al. | 544/316 |
| 4,871,469 | 10/1989 | Reiffenrath et al. | 252/299.61 |
| 4,911,863 | 3/1990 | Sage et al. | 252/299.65 |
| 5,112,523 | 5/1992 | Yoshida et al. | 252/299.61 |
| 5,250,220 | 10/1993 | Wachtler et al. | 252/299.61 |

FOREIGN PATENT DOCUMENTS

| | | |
|---|---|---|
| 0123907 | 11/1984 | European Pat. Off. . |
| 0199004 | 10/1986 | European Pat. Off. . |
| 0193191 | 9/1988 | European Pat. Off. . |
| 0275701 | 1/1990 | German Dem. Rep. . |
| 144423 | 10/1980 | Germany . |
| 3515373 | 11/1986 | Germany . |
| 4025370 | 2/1991 | Germany . |
| 3196685 | 8/1988 | Japan . |

*Primary Examiner*—C. Harris
*Attorney, Agent, or Firm*—Fitzpatrick, Cella, Harper & Scinto

[57] ABSTRACT

A chiral smectic liquid crystal composition is formed by including at least one species of a mesomorphic compound represented by the following formula (I):

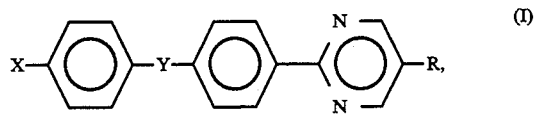

wherein X denotes F, Cl, Br, $CF_3$, $NO_2$ or CN; Y denotes a single bond,

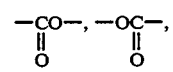

—$CH_2O$— or —$OCH_2$—; and R denotes a linear or branched alkyl group having 1–20 carbon atoms optionally substituted. The composition shows improved switching characteristics and, when used in combination with an alignment film providing a high pre-tilt angle, provides an increased contrast at a large drive margin and with little tendency of monostabilization of a memory state.

19 Claims, 8 Drawing Sheets

CHIRAL SMECTIC LIQUID CRYSTAL COMPOSITION, LIQUID CRYSTAL DEVICE, DISPLAY APPARATUS AND DISPLAY METHOD

This application is a continuation of application Ser. No. 695,596, filed May 3, 1991, now abandoned.

FIELD OF THE INVENTION AND RELATED ART

The present invention relates to a novel a liquid crystal composition a liquid crystal device, a display apparatus and a display method, and more particularly to a novel liquid crystal composition with improved responsiveness to an electric field, a liquid crystal device using the liquid crystal composition for use in a display apparatus, a liquid crystal-optical shutter, etc., a display apparatus using the device, and a display method using the composition and device.

Hitherto, liquid crystal devices have been used as an electro-optical device in various fields. Most liquid crystal devices which have been put into practice use TN (twisted nematic) type liquid crystals, as shown in "Voltage-Dependent Optical Activity of a Twisted Nematic Liquid Crystal" by M. Schadt and W. Helfrich "Applied Physics Letters" Vol. 18, No. 4 (Feb. 15, 1971) pp. 127–128.

These devices are based on the dielectric alignment effect of a liquid crystal and utilize an effect that the average molecular axis direction is directed to a specific direction in response to an applied electric field because of the dielectric anisotropy of liquid crystal molecules. It is said that the limit of response speed is on the order of milli-seconds, which is too slow for many uses. On the other hand, a simple matrix system of driving is most promising for application to a large-area flat display in view of cost, productivity, etc., in combination. In the simple matrix system, an electrode arrangement wherein scanning electrodes and signal electrodes are arranged in a matrix, and for driving, a multiplex driving scheme is adopted wherein an address signal is sequentially, periodically and selectively applied to the scanning electrodes and prescribed data signals are selectively applied in parallel to the signal electrodes in synchronism with the address signal.

When the above-mentioned TN-type liquid crystal is used in a device of such a driving system, a certain electric field is applied to regions where a scanning electrode is selected and signal electrodes are not selected or regions where a scanning electrode is not selected and a signal electrode is selected (which regions are so called "half-selected points"). If the difference between a voltage applied to the selected points and a voltage applied to the half-selected points is sufficiently large, and a voltage threshold level required for allowing liquid crystal molecules to be aligned or oriented perpendicular to an electric field is set to a value therebetween, display devices normally operate. However, in fact, as the number (N) of scanning lines increases, a time (duty ratio) during which an effective electric field is applied to one selected point when a whole image area (corresponding to one frame) is scanned decreases with a ratio of 1/N. Accordingly, the larger the number of scanning lines are, the smaller is the voltage difference of an effective value applied to a selected point and non-selected points when scanning is repeatedly effected. As a result, this leads to unavoidable drawbacks of lowering of image contrast or occurrence of interference or crosstalk. These phenomena are regarded as essentially unavoidable problems appearing when a liquid crystal having no bistability (i.e. liquid crystal molecules are horizontally oriented with respect to the electrode surface as stable state and is vertically oriented with respect to the electrode surface only when an electric field is effectively applied) is driven (i.e. repeatedly scanned) by making use of a time storage effect. To overcome these drawbacks, the voltage averaging method, the two-frequency driving method, the multiple matrix method, etc. has been already proposed. However, any method is not sufficient to overcome the above-mentioned drawbacks. As a result, it is the present state that the development of large image area or high packaging density in respect to display elements is delayed because it is difficult to sufficiently increase the number of scanning lines.

To overcome drawbacks with such prior art liquid crystal devices, the use of liquid crystal devices having bistability has been proposed by Clark and Lagerwall (e.g. Japanese Laid-Open Patent Appln. No. 56-107216, U.S. Pat. No. 4,367,924, etc.). In this instance, as the liquid crystals having bistability, ferroelectric liquid crystals having chiral smectic C-phase (SmC*) or H-phase (SmH*) are generally used. These liquid crystals have bistable states of first and second stable states with respect to an electric field applied thereto. Accordingly, as different from optical modulation devices in which the above-mentioned TN-type liquid crystals are used, the bistable liquid crystal molecules are oriented to first and second optically stable states with respect to one and the other electric field vectors, respectively. Further, this type of liquid crystal has a property (bistability) of assuming either one of the two stable states in response to an applied electric and retaining the resultant state in the absence of an electric field.

In addition to the above-described characteristic of showing bistability, such a ferroelectric liquid crystal (hereinafter sometimes abbreviated as "FLC") has an excellent property, i.e., a high-speed responsiveness. This is because the spontaneous polarization of the ferroelectric liquid crystal and an applied electric field directly interact with each other to induce transition of orientation states. The resultant response speed is faster than the response speed due to the interaction between dielectric anisotropy and an electric field by 3 to 4 digits.

Thus, a ferroelectric liquid crystal potentially has very excellent characteristics, and by making use of these properties, it is possible to provide essential improvements to many of the above-mentioned problems with the conventional TN-type devices. Particularly, the application to a high-speed optical shutter and a display of a high density and a large picture is expected. For this reason, there has been made extensive research with respect to liquid crystal materials showing ferroelectricity. However, ferroelectric liquid crystal materials developed heretofore cannot be said to satisfy sufficient characteristics required for a liquid crystal device including low-temperature operation characteristic, high-speed responsiveness, etc. Among a response time $\tau$, the magnitude of spontaneous polarization Ps and viscosity $\eta$, the following relationship exists: $\tau = \eta/(Ps \cdot E)$, where E is an applied voltage. Accordingly, a high response speed can be obtained by (a) increasing the spontaneous polarization Ps, (b) lowering the viscosity $\eta$, or (c) increasing the applied voltage E. However, the driving voltage has a certain upper limit in view of driving with IC, etc., and should desirably be as low as possible. Accordingly, it is actually necessary to lower the viscosity or increase the spontaneous polarization.

A ferroelectric chiral smectic liquid crystal having a large spontaneous polarization generally provides a large internal electric field in a cell given by the spontaneous polarization and is liable to pose many constraints on the device construction giving bistability. Further, an excessively large spontaneous polarization is liable to accompany an increase in viscosity, so that remarkable increase in response speed may not be attained as a result.

Further, if it is assumed that the operation temperature of an actual display device is 5°-40° C. the response speed changes by a factor of about 20, so that it actually exceeds the range controllable by driving voltage and frequency.

For an optical modulating device by use of a liquid crystal having such bistability to exhibit desirable driving characteristics, it is required that the liquid crystal disposed between a pair of substrates should be in such a molecular alignment state that conversion between the above two stable states may occur effectively irrespective of the application of an electrical field.

Further, in a liquid crystal device utilizing birefringence of a liquid crystal, the transmittance under right angle cross nicols is given by the following equation:

$$I/I_0 = \sin^2 4\theta \cdot \sin^2 (\Delta nd/\lambda)\pi,$$

wherein
- $I_0$: incident light intensity,
- $I$: transmitted light intensity,
- $\theta$: tilt angle,
- $\Delta n$: refractive index anisotropy,
- $d$: thickness of the liquid crystal layer,
- $i$: wavelength of the incident light.

The tilt angle $\theta$ in the above-mentioned non-helical structure is recognized as a half of an angle between the average molecular axis directions of liquid crystal molecules in a twisted alignment in a first orientation state and a second orientation state. According to the above equation, it is shown that a tilt angle $\theta$ of 22.5 degrees provides a maximum transmittance and the tilt angle in a non-helical structure for realizing bistability should desirably be as close as possible to 22.5 degrees.

A method for aligning a ferroelectric liquid crystal should desirably be such that molecular layers each composed of a plurality of molecules of a smectic liquid crystal are aligned uniaxially along their normals, and it is desirable to accomplish such an alignment state by a rubbing treatment which requires only a simple production step.

As an alignment method for a ferroelectric liquid crystal, particularly a chiral smectic liquid crystal in a non-helical structure, one disclosed in U.S. Pat. No. 4,561,726 has been known for example.

However, when a conventional alignment method, particularly one using a polyimide film treated by rubbing, is applied for alignment of a ferroelectric liquid crystal in a non-helical structure exhibiting bistability reported by Clark and Lagerwall, the following problems are encountered.

That is, according to our experiments, it has been found that a tilt angle $\theta$ (an angle shown in FIG. 3 as described below) in a ferroelectric liquid crystal with a non-helical structure obtained by alignment with an alignment control film of the prior art has become smaller as compared with a tilt angle Ⓗ (the angle Ⓗ is a half of the apex angle of the cone shown in FIG. 2 as described below) in the ferroelectric liquid crystal having a helical structure. Particularly, the tilt angle $\theta$ in a ferroelectric liquid crystal with a non-helical structure obtained by alignment with alignment control films of the prior art was found to be generally on the order of 3–8 degrees, and the transmittance at that time was at most about 3 to 5%.

Thus, according to Clark and Lagerwall, the tilt angle in a ferroelectric liquid crystal with a non-helical structure realizing bistability should have the same angle as the tilt angle in the ferroelectric liquid crystal having a helical structure, but in fact the tilt angle $\theta$ in a non-helical structure is smaller than the tilt angle Ⓗ in a helical structure. More specifically, it has been found that the tilt angle $\theta$ in a non-helical structure becomes smaller than the tilt angle Ⓗ because of a twist alignment of liquid crystal molecules in the non-helical structure. Thus, in a ferroelectric liquid crystal having a non-helical structure, liquid crystal molecules are aligned with a twist from a molecular axis 42 adjacent to an upper substrate to a molecular axis 43 adjacent to a lower substrate (i.e., in the direction 44 of a twist alignment) continuously at a certain twist angle δ, as shown in FIG. 4. This leads to a phenomenon that the tilt angle $\theta$ in the non-helical structure is smaller than the Ⓗ in the helical structure. In FIG. 4, a uniaxial alignment axis 41 is formed on each of a pair of substrates by rubbing or oblique vapor deposition.

Further, in an alignment state of a chiral smectic liquid crystal attained by a conventional polyimide alignment film subjected to a rubbing treatment, when a liquid crystal is supplied with a voltage of one polarity for switching from a first optically stable state (e.g., a white display state) to a second optically stable state (e.g., a black display state) and then the voltage of one polarity is removed, the ferroelectric liquid crystal layer is supplied with a reverse electric field Vrev due to the presence of the polyimide film as an insulating layer between the electrode and the liquid crystal layer, and the reverse electric field Vrev has caused an afterimage during display. The generation of the above-mentioned reverse electric field has been reported in "Switching characteristic of SSFLC" by Akio Yoshida, "Preprint for Liquid Crystal Forum, October 1987" p.p. 142–143.

With respect to the alignment state of the ferroelectric liquid crystal, the following phenomenon has been reported by, e.g., Japanese Laid-Open Patent Application (KOKAI) NO. 158415/1989. More specifically, two substrates each provided with an insulating alignment control layer comprising a film ("LP-64" (trade name), available from Toray K. K.) providing a relatively low pre-tilt angle by coating are each subjected to rubbing in an direction A and superposed with each other with a gap of about 1.5 micron to form a blank cell. Into the cell, a ferroelectric liquid crystal "CS-1014" (trade name, available from Chisso K. K.) is injected, and after sealing, aligned by cooling from a higher temperature phase as shown in FIGS. 5A–5E. More specifically, FIG. 5A shows a C1 alignment domain or sub-phase including lower contrast states 51 and 52 which is formed immediately after a transition from the higher-temperature phase to a chiral smectic C (SmC*) phase. When the cell is further cooled, a zig-zag defect 53 occurs at a certain temperature and constitutes a boundary changing from the C1 alignment domain to a C2 alignment domain or sub-phase including relatively high contrast orientation states 54 and 55 surrounded by the C1 alignment domain as shown in FIG. 5B. The C2 alignment domain gradually extends as the cell is cooled as shown in FIGS. 5C and 5D. As a result, the C2 alignment domain occupies an entire area as shown in FIG. 5E. Referring to FIG. 6, a C1 alignment domain 62 and a C2 alignment domain 63 respectively have a different chevron structure in a chiral smectic C phase 61. In FIG. 6, an upper substrate 64a and a lower substrate 64b each provided with a common rubbing direction A are disposed with a prescribed gap.

When the ferroelectric liquid crystal assuming the alignment states including the C1 and C2 alignment domains is used for display in combination with the above-mentioned insulating alignment control film providing a relatively lower pre-tilt angle, there occurs a problem that clear images with a sufficiently high contrast and high transmittance cannot be obtained.

As described hereinabove, commericalization of a ferroelectric liquid crystal device requires a liquid crystal composition assuming a chiral smectic phase which has a low viscosity, a high-speed responsiveness and a small temperature-dependence of response speed.

Further, a ferroelectric liquid crystal device is desired to provide a clear image having a high contrast and transmittance and free of an after-image.

In order to provide a practical ferroelectric liquid crystal device, we have studied various combinations of liquid crystals and insulating alignment control layers (films). As a result, when certain liquid crystals and certain insulating alignment control layers are used in combination, we have found (1) that a transition from a C1 alignment domain to a C2 alignment domain does not readily occur or does not occur at all and (2) that two stable states providing a large contrast (hereinafter, referred to as "uniform alignment state"), other than the conventionally known two stable states providing a small contrast (hereinafter, referred to as "spray alignment states") wherein directors of liquid crystal molecules are successively twisted between a pair of substrates, appear in the C1 alignment domain.

The two stable states or orientation states in the splay alignment and the two stable states or orientation states in the uniform alignment are respectively switched from one to the other. More specifically, switching between the two states in the splay alignment is caused by application of a relatively weak positive or negative pulse electric field, and switching between the two states in the uniform alignment is caused by application of a relatively strong positive or negative pulse electric field.

Of the above two types of alignment states, a display device providing a bright and high-contrast image compared with the conventional display devices can be realized by utilizing the uniform alignment state. Such a display device utilizing the uniform alignment state further has the advantage of the transition between two uniform orientation states accompanying no after-image.

Accordingly, a high-quality display system compared with the conventional one is expected to forming a C1 alignment domain over an entire picture area and employing two uniform orientation states in the C1 alignment domain as white and black display states.

However, the above display system poses a problem that a threshold characteristic between the two uniform orientation states is changed with time when the display state is retained for a long time in either one stable or orientation state (memory state). In this instance, there occurs a phenomenon that the above one stable state retained for a long time is firmly stabilized and cannot be readily switched to another stable state (hereinafter, referred to as "standing monostabilization" or "monostabilization (of a memory state)").

Moreover, as briefly suggested above, not all the liquid crystal materials cannot provide such a C1 uniform alignment state even if they are used in combination with an appropriate insulating alignment film, i.e., an insulating film providing a high pre-tilt angle. Thus, a liquid crystal material capable of forming a C1 alignment state free from after-image caused by the monostabilization of a memory state, is desired.

SUMMARY OF THE INVENTION

An object of the present invention is to provide a chiral smectic liquid crystal composition for providing a practical ferroelectric liquid crystal device, a liquid crystal device using the liquid crystal composition and having a high response speed and a smaller temperature-dependence of the response speed, a display apparatus using the device, and a display method using the composition and device.

Another object of the present invention is to provide a chiral smectic liquid crystal composition and a liquid crystal device using the composition in combination with an insulating alignment control film providing a high pre-tilt angle so that the device provides a large tilt angle in a non-helical structure of the composition, a high-contrast image with a high transmittance and good switching characteristics.

According to the present invention, there is provided a chiral smectic liquid crystal composition comprising at least one species of a mesomorphic compound represented by the following formula (I):

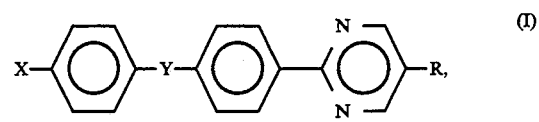

wherein X denotes F, Cl, Br, CF$_3$, NO$_2$ or CN; Y denotes a single bond,

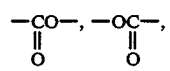

—CH$_2$O— or —OCH$_2$—; and R denotes a linear or branched alkyl group having 1–20 carbon atoms optionally substituted.

The present invention provides a liquid crystal device comprising a pair of electrode plates and the liquid crystal composition described above disposed between the electrode plates.

The present invention further provides a display apparatus comprising the liquid crystal device, and voltage application means for driving the liquid crystal device.

The present invention still further provides a display method using the liquid crystal composition or the liquid crystal device described above and switching the alignment direction of liquid crystal molecules by using voltage application means to effect display.

More specifically, the composition according to the present invention containing the specific mesomorphic compound is usable for a ferroelectric liquid crystal device having an improved response characteristic. Further, the composition is used in combination with a specific insulating alignment control film providing a high pre-tilt angle, whereby good switching operation can be effected without monostabilization of a memory state in a C1 alignment domain. Further, the high pre-tilt angle of liquid crystal molecules provides a high tilt angle of liquid crystal molecules with a non-helical structure. As a result, there is provided a high-contrast image having a high transmittance.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
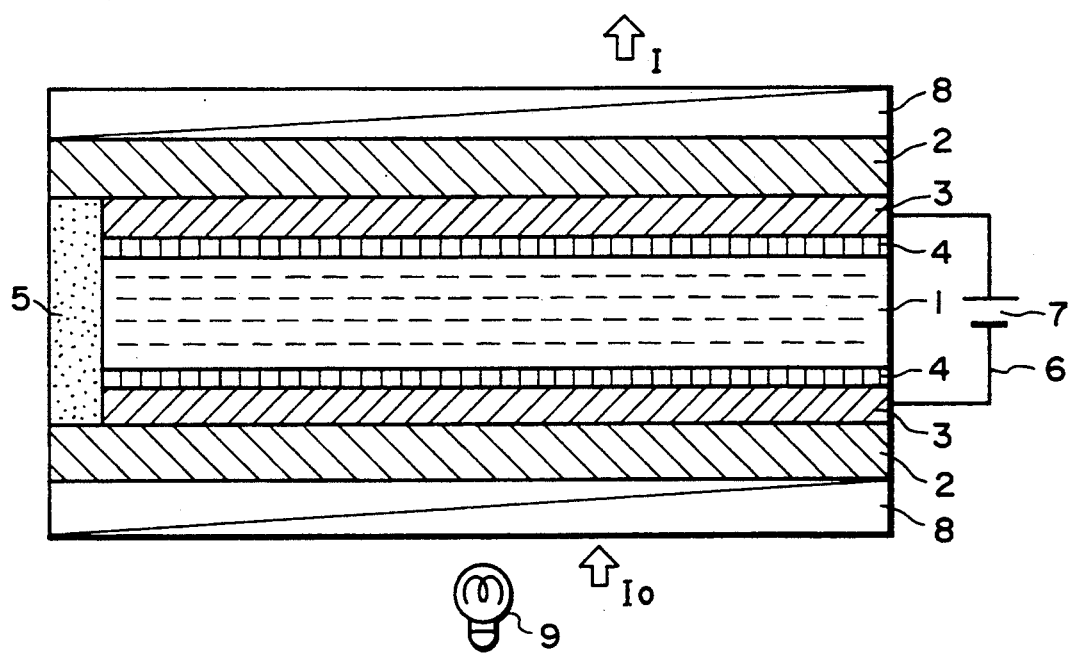
FIG. 1 is a schematic sectional view of a liquid crystal display device using a liquid crystal composition assuming a chiral smectic phase.

In the formula (I) described above, preferred examples of Y may include

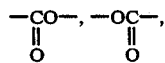

—CH$_2$O— and —OCH$_2$—, particularly

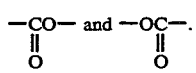

Further, preferred examples of R may include a linear or branched alkyl group having 1–18 carbon atoms.

The mesomorphic compounds represented by the formula (I) used in the present invention may be synthesized through the following reaction schemes.

(Case where Y is a single bond)

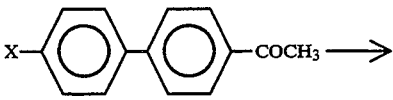

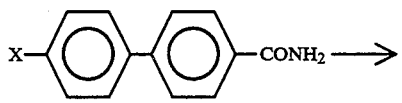

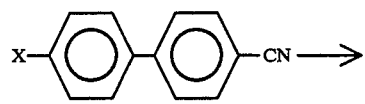

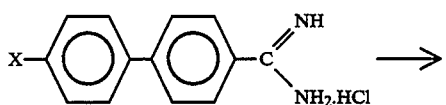

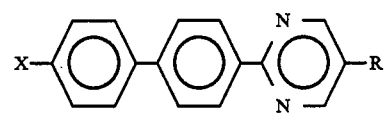

(Case where Y is —CO—)
        ‖
        O

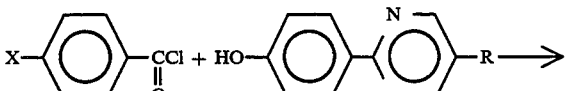

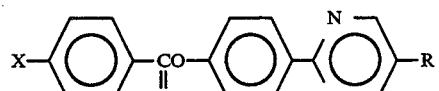

(Case where Y is —OC—)
        ‖
        O

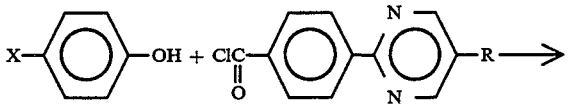

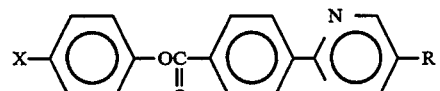

(Case where Y is —CH$_2$O)

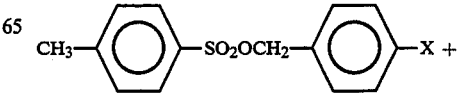

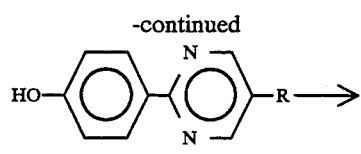
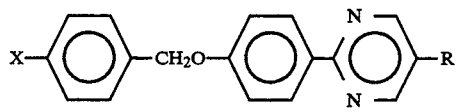
(Case where Y is —OCH₂)
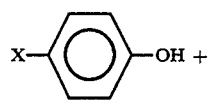
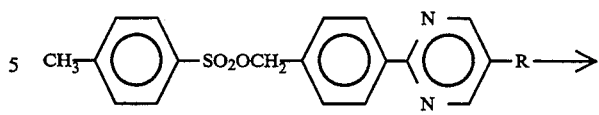
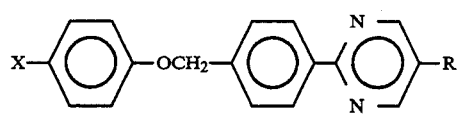
Specific examples of the mesomorphic compounds represented by the above-mentioned general formula (I) used in the present invention may include those shown by the following structural formulas.
(1) 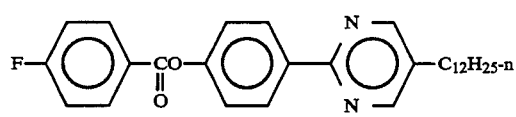
(2) 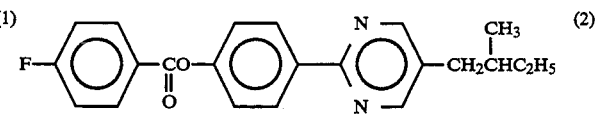
(3) 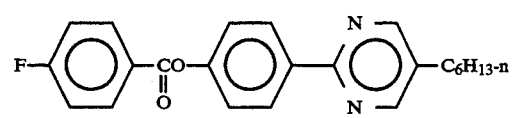
(4) 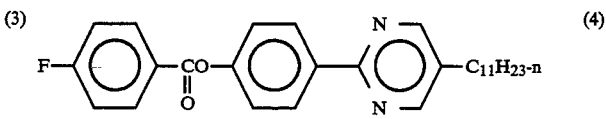
(5) 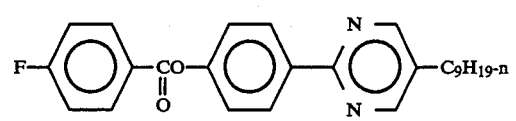
(6) 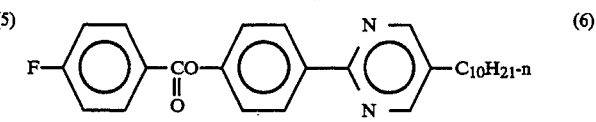
(7) 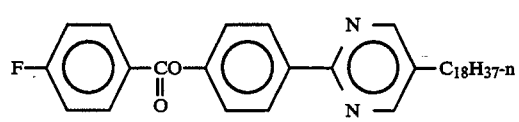
(8) 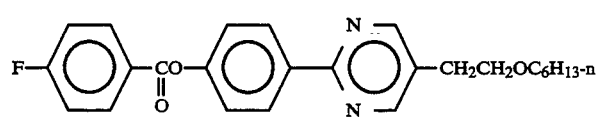
(9) 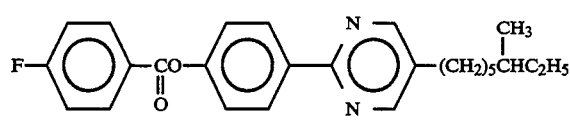
(10) 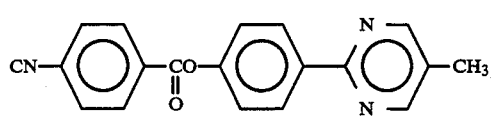
(11) 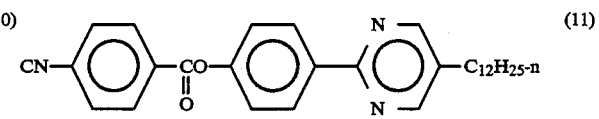
(12) 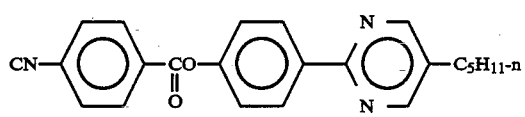
(13) 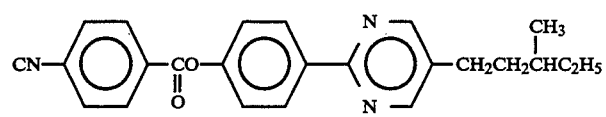
(14) 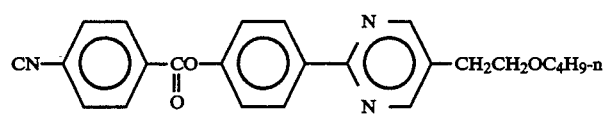

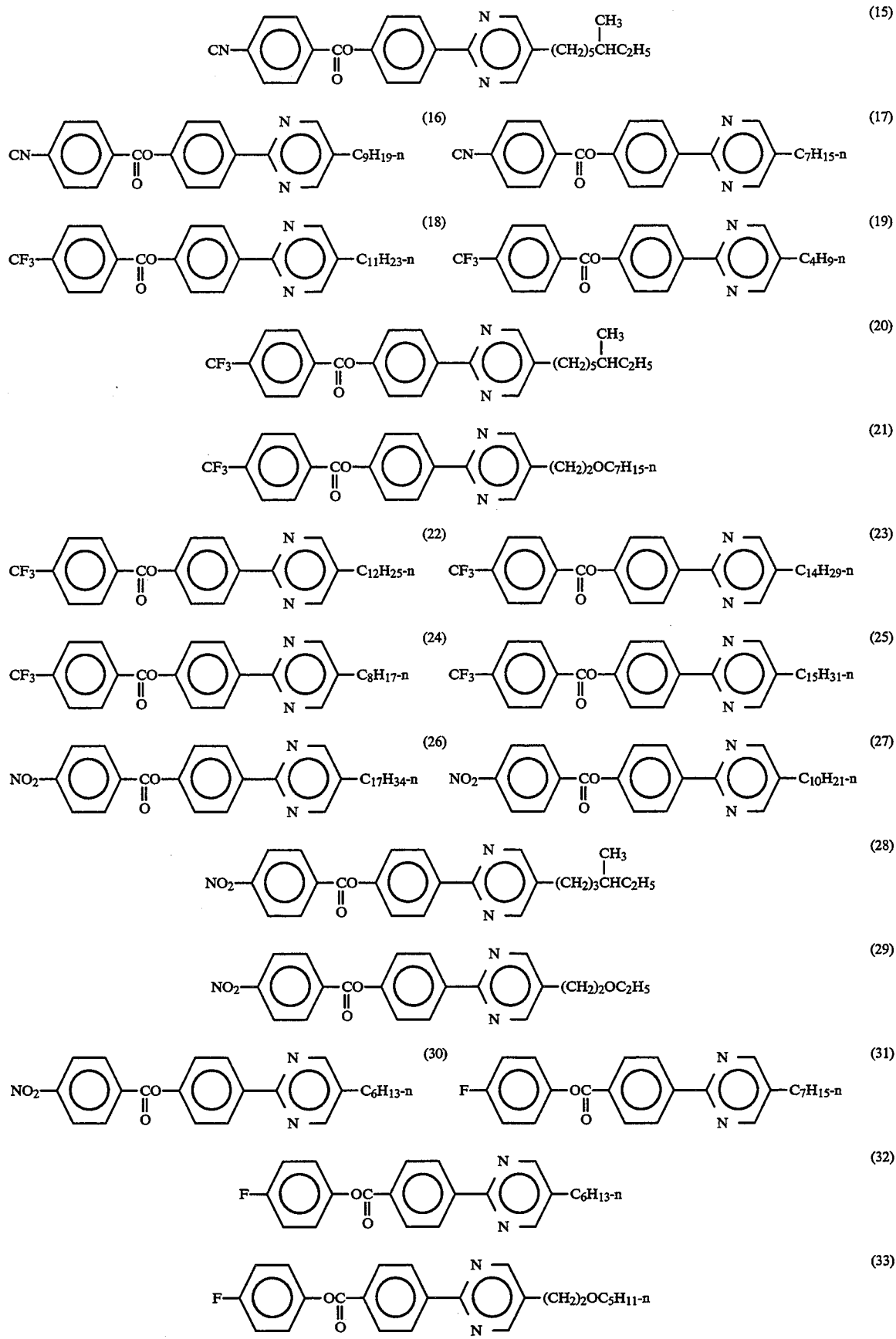

-continued
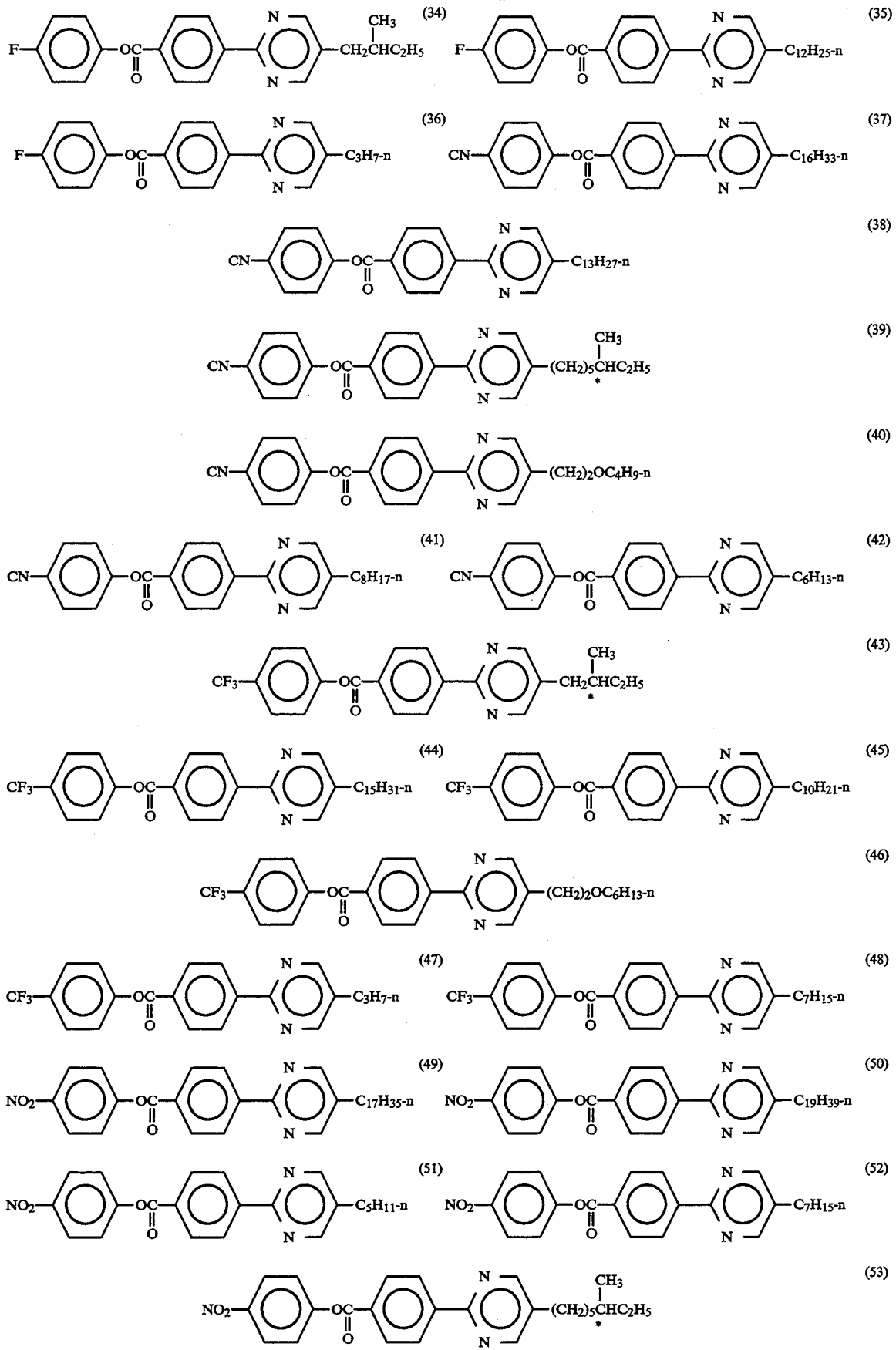

-continued
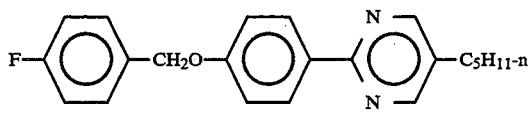 (54)
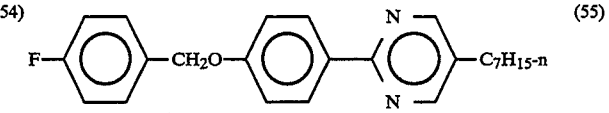 (55)
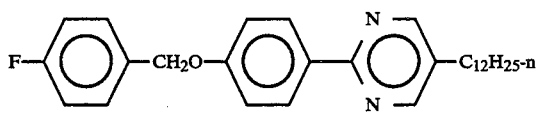 (56)
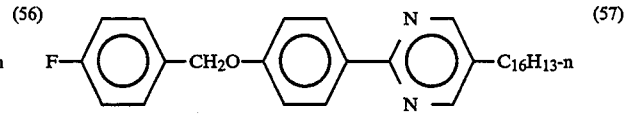 (57)
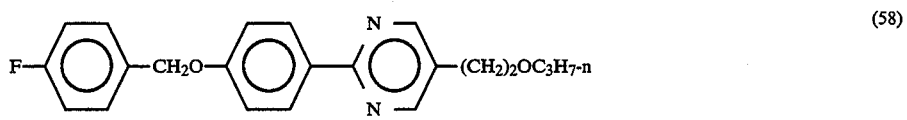 (58)
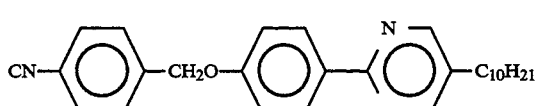 (59)
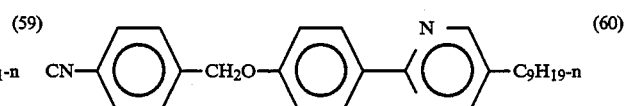 (60)
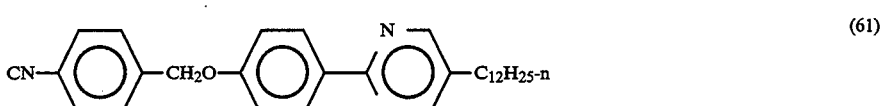 (61)
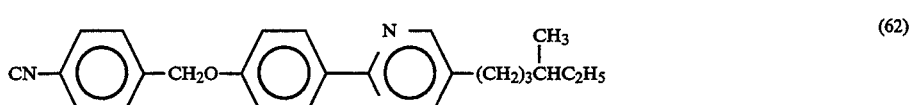 (62)
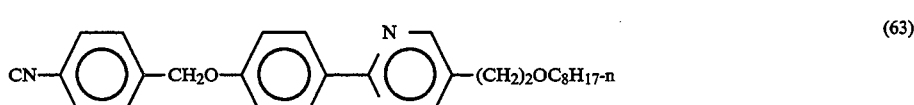 (63)
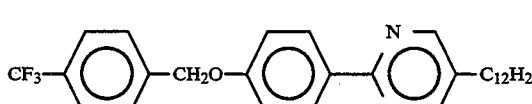 (64)
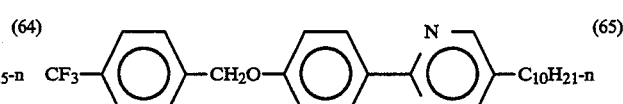 (65)
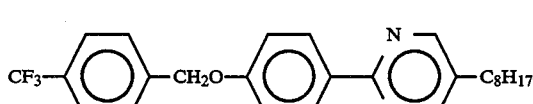 (66)
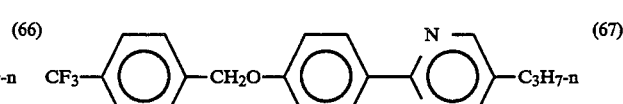 (67)
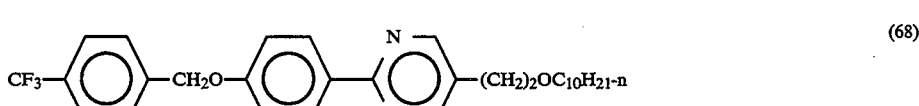 (68)
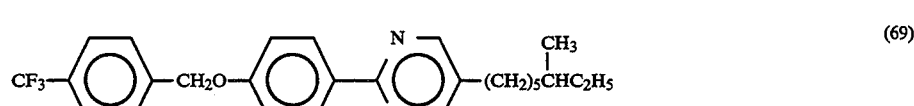 (69)
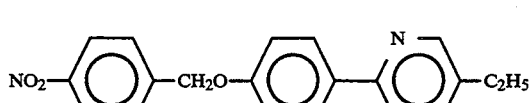 (70)
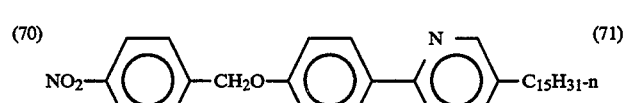 (71)
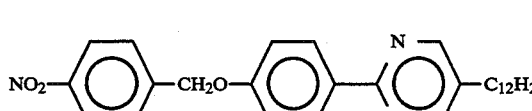 (72)
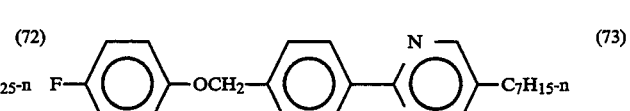 (73)

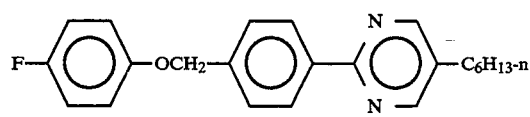 (74)
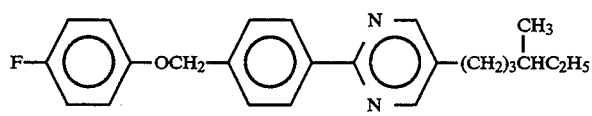 (75)
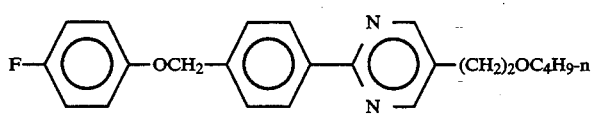 (76)
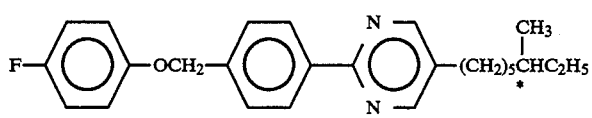 (77)
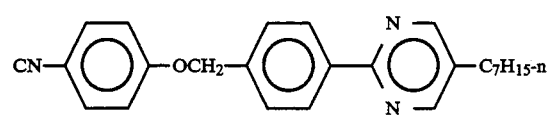 (78)
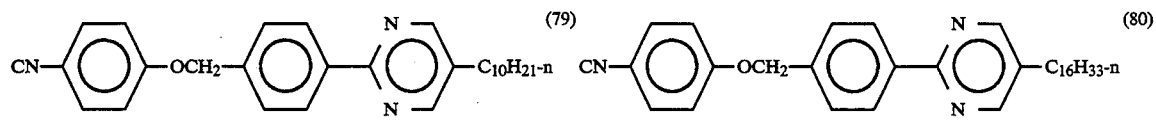 (79) (80)
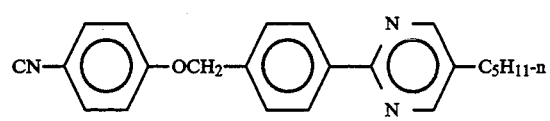 (81)
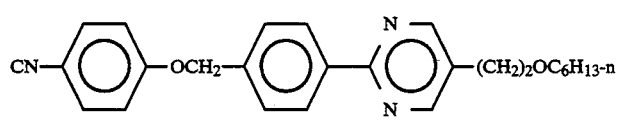 (82)
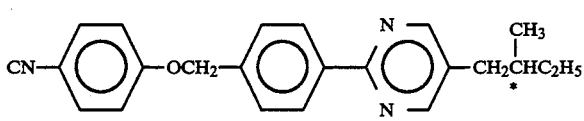 (83)
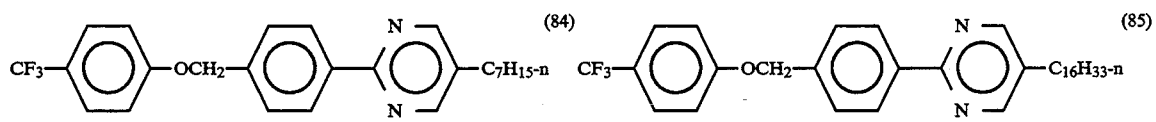 (84) (85)
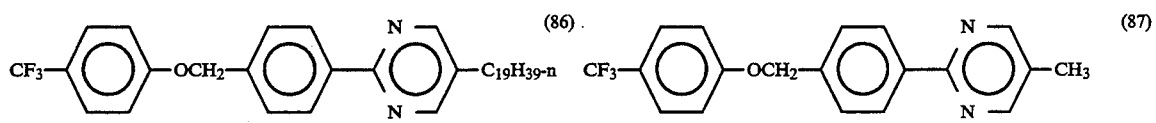 (86) (87)
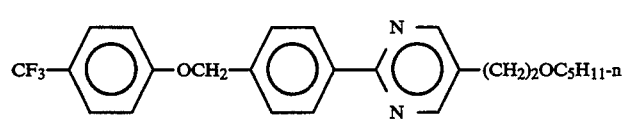 (88)
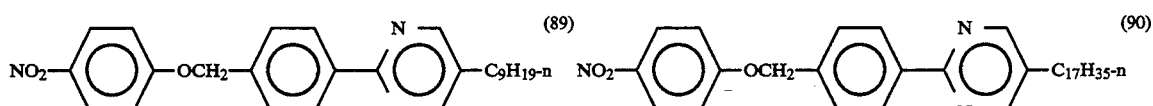 (89) (90)

-continued
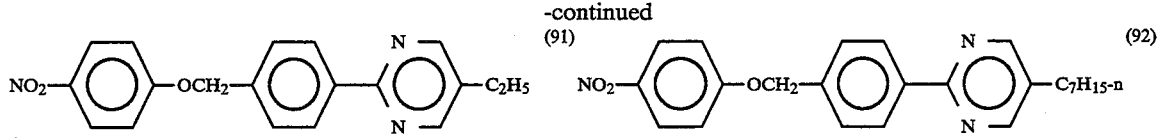(91)(92)
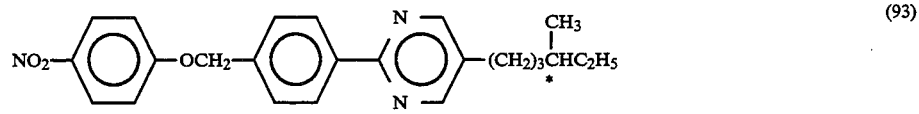(93)
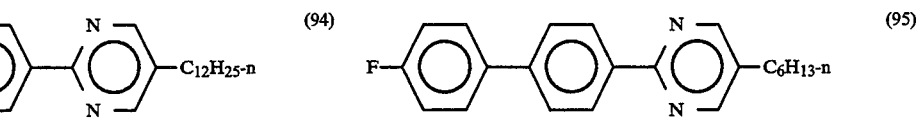(94) 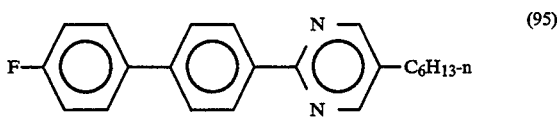(95)
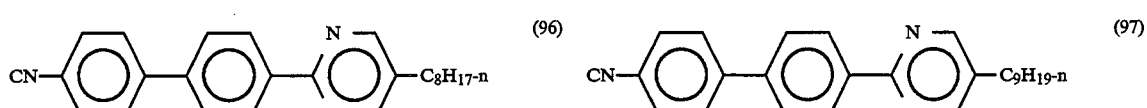(96) 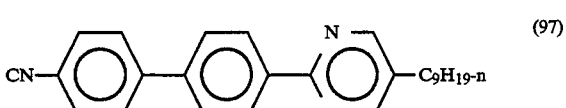(97)
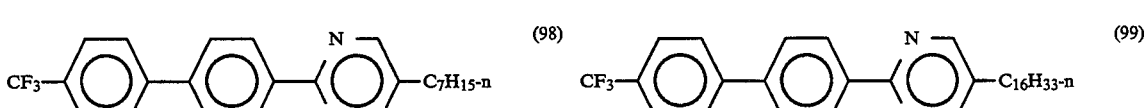(98) 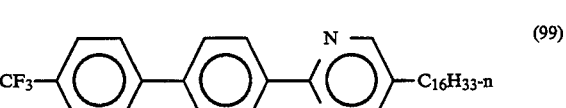(99)
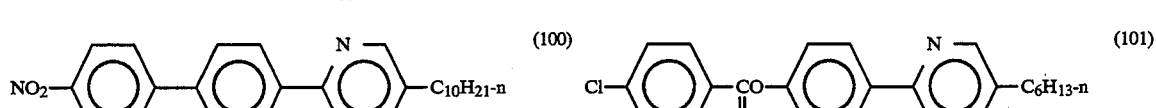(100) 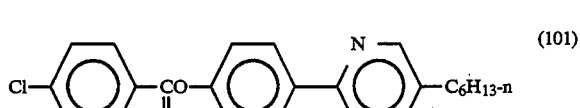(101)
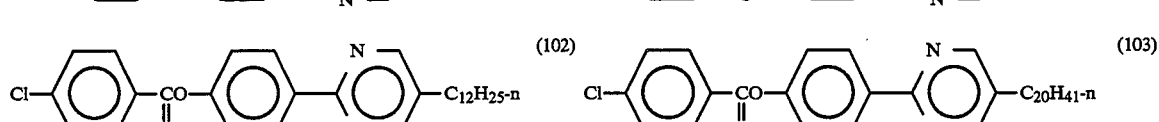(102) 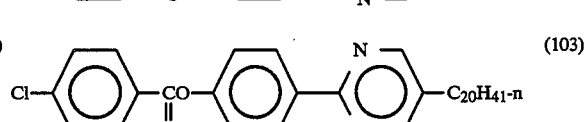(103)
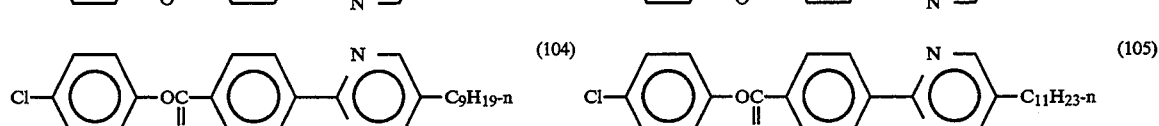(104) 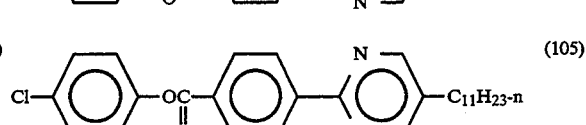(105)
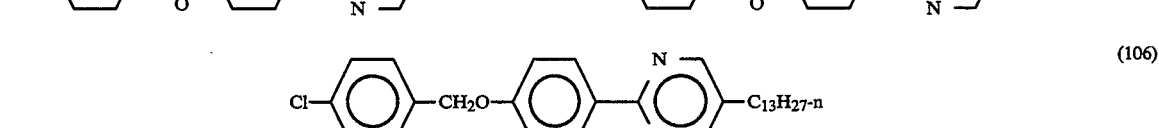(106)
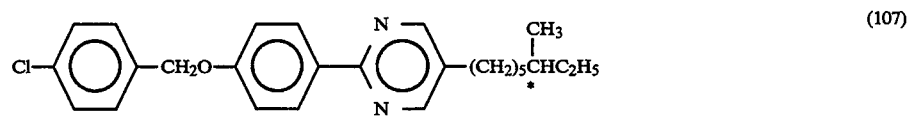(107)
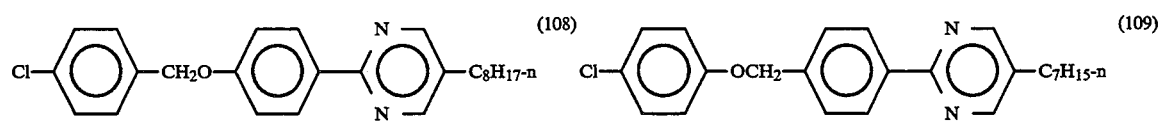(108) 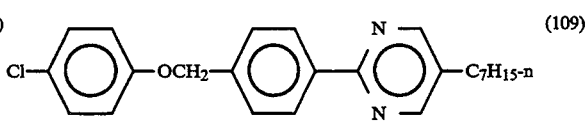(109)
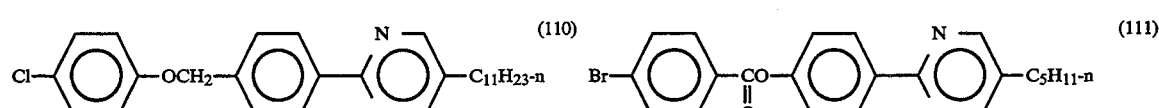(110) 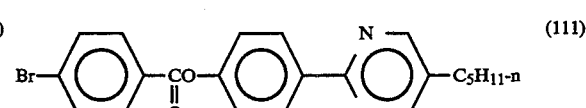(111)
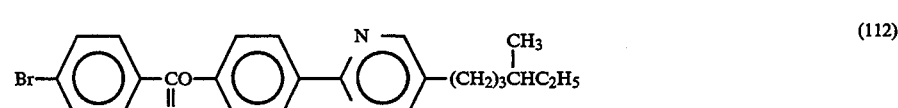(112)

-continued

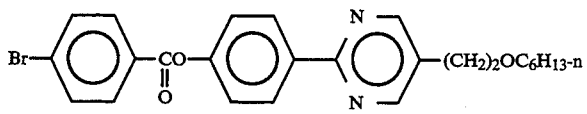
(113)

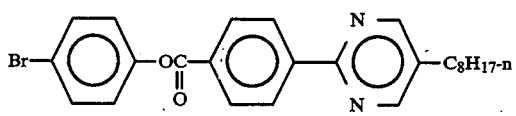
(114)

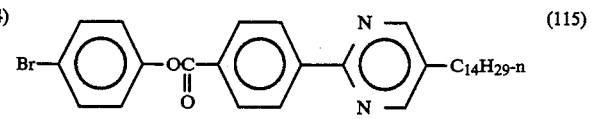
(115)

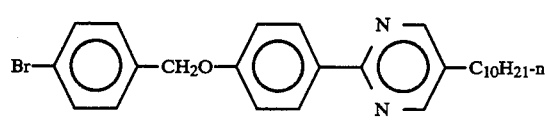
(116)

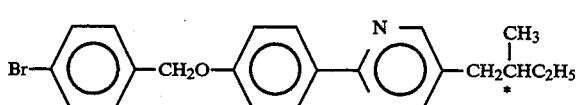
(117)

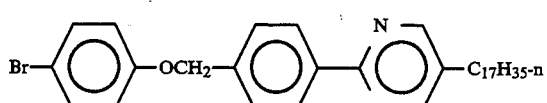
(118)

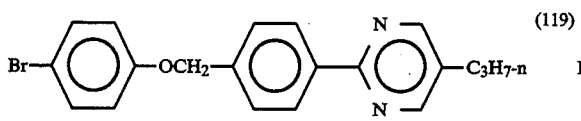
(119)

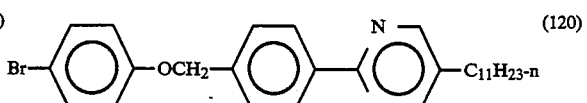
(120)

A representative example of synthesis of a compound represented by the formula (I) is described below.

SYNTHESIS EXAMPLE 1

Production of a mesomorphic compound of the formula:

(Example Compound No. 11)

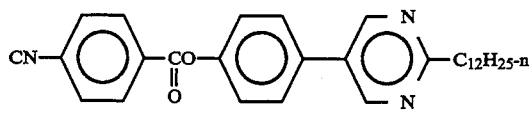

In a 30 ml-round-bottomed flask, 1 g (6.80 mM) of 4-cyanobenzoic acid, 2.31 g (6.80 mM) of 5-dodecyl-2-(4'-hydroxyphenyl)pyrimidine, 1.4 g (6.80 mM) of dicyclohexylcarbodiimide and 0.03 g of pyrrolidinopyridine were placed. To the mixture, 35 ml of methylene chloride was added, followed by stirring overnight at room temperature. After the reaction, the reaction mixture was subjected to filtration, followed by washing of the filtrate with methylene chloride. The solvent was distilled off from the filtrate to obtain a crude product. The crude product was recrystallized from a mixture solvent of ethanol/ethyl acetate=9/1 to obtain 2.55 g (5.44 mM) of a white objective product (Yield: 80%).

Phase transition temperature (°C)

Cryst. $\underset{85.6}{\overset{90.5}{\rightleftarrows}}$ Sm2 $\underset{111.6}{\overset{116}{\rightleftarrows}}$ SmA $\underset{205.0}{\overset{205.3}{\rightleftarrows}}$ Iso.

Cryst.: crystal,
Sm2: smectic phase (unidentified),
SmA: smectic A phase, and
Iso.: isotropic phase.

The liquid crystal composition according to the present invention may be obtained by mixing at least one species of the compound represented by the formula (I) and another mesomorphic compound in appropriate proportions. The liquid crystal composition according to the present invention may preferably be formulated as a liquid crystal composition capable of utilizing ferroelectricity. Accordingly, a liquid crystal composition showing a chiral smectic phase is used.

Specific examples of another mesomorphic compound as described above may include those denoted by the following formulas (III) to (XII).

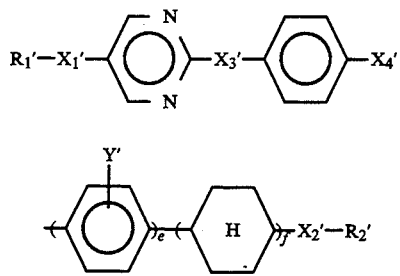

wherein e denotes 0 or 1 and f denotes 0 or 1 with proviso that e+f=0 or 1; Y' denotes H, halogen, $CH_3$ or $CF_3$; $X_1'$ and $X_2'$ respectively denote a single bond, $$-\underset{O}{\overset{\|}{C}}O-, -O\underset{O}{\overset{\|}{C}}-,$$

—O— or and $X_3'$ and $X_4'$ respectively denote a single bond,

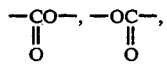

—OCH₂ or —CH₂O—.

In the formula (III), preferred compounds thereof may include those represented by the following formulas (IIIa) to (IIId):

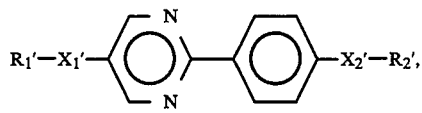
(IIIa)

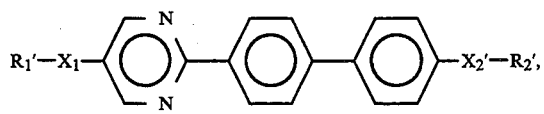
(IIIb)

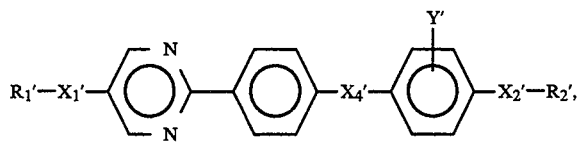
(IIIc)

and

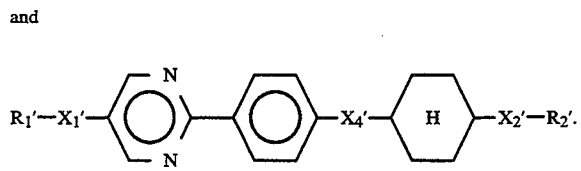
(IIId)

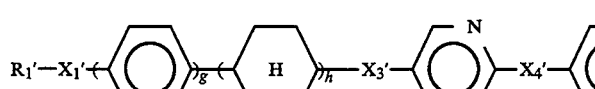
(IV)

wherein g and h respectively denote 0 or 1 with proviso that g+h=1; i denotes 0 or 1; $X_1'$ and $X_2'$ respectively denote a single bond,

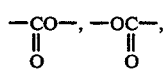

—O— or

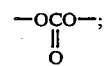

and $X_3'$, $X_4'$ and $X_5'$ respectively denote a single bond,

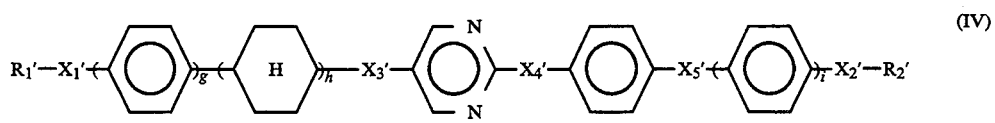

—CH₂O— or —OCH₂—.

In the formula (IV), preferred compounds thereof may include those represented by the following formulas (IVa) to (IVc):

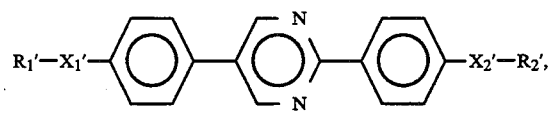
(IVa)

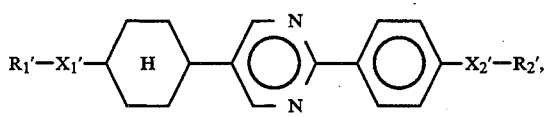
(IVb)

and

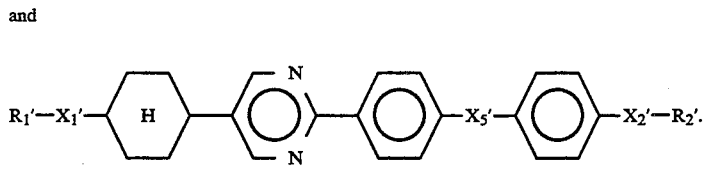
(IVc)

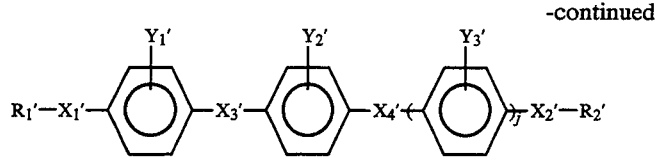

wherein j denotes 0 or 1; $Y_1'$, $Y_2'$ and $Y_3'$ respectively denote H, halogen, $CH_3$ or $CF_3$; $X_1'$ and $X_2'$ respectively denote a single bond,

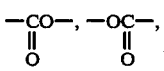

—O— and

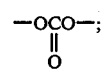

and $X_3'$ and $X_4'$ respectively denote a single bond,

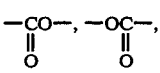

—CH$_2$O—, —OCH$_2$—, CH$_2$CH$_2$—,

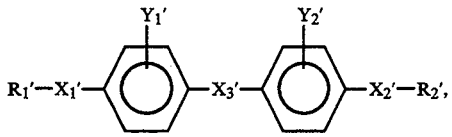

or —O—.

In the formula (V), preferred compounds thereof may include those represented by the following formulas (Va) and (Vb):

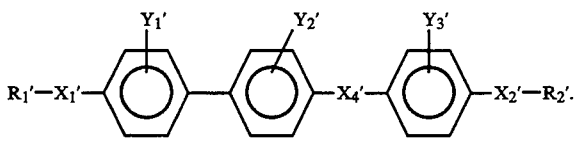

and

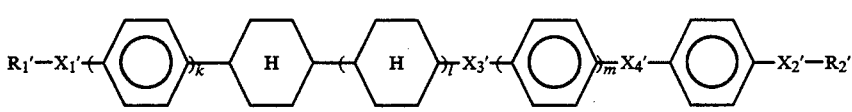

wherein k, 1 and m respectively denote 0 or 1 with proviso that k+1+m=0, 1 or 2; $X_1'$ and $X_2'$ respectively denote a single bond,

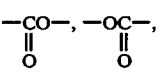

—O— or (V)

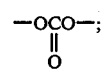

and $X_3'$ and $X_4'$ respectively denote a single bond,

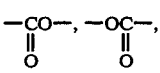

—CH$_2$O or —OCH$_2$—.

In the formula (VI), preferred compounds thereof may include those represented by the following formulas (VIa) to (VIf):

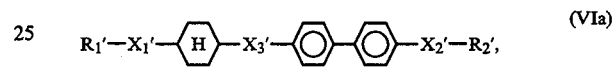 (VIa)

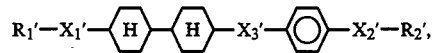 (VIb)

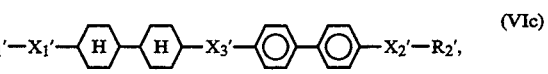 (VIc)

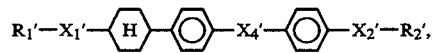 VId)

(Va)

(Vb)

(VI)

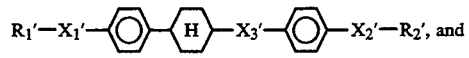 (VIe)

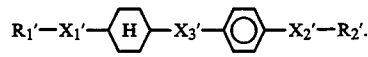 (VIf)

Herein, $R_1'$ and $R_2'$ respectively denote a linear or branched alkyl group having 1-18 carbon atoms capable of including one or two or more non-neighboring methylene groups which can be replaced with —CH halogen— and capable of further including one or two or more non-neighboring methylene groups other than those directly connected to $X_1'$ or $X_2'$ which can be replaced with at least one species of —O—,

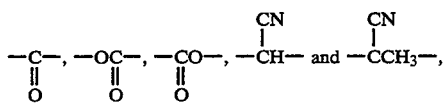

with proviso that $R_1'$ and $R_2'$ respectively do not connect to a ring structure by a single bond when $R_1'$ and $R_2'$ respectively denote a halogenated alkyl group containing one methylene group replaced with —CH halogen-.

Further, preferred examples of $R_1'$ and $R_2'$ may respectively include those represented by the following groups (i) to (vii):

i) a linear alkyl group having 1-15 carbon atoms;
ii)

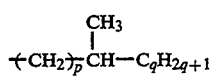

wherein p denotes an integer of 0-5 and q denotes an integer of 1-11 (optically active or inactive);
iii)

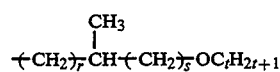

wherein r denotes an integer of 0-6, s denotes 0 or 1, and t denotes an integer of 1-14 (optically active or inactive);
iv)

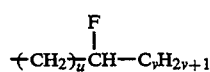

wherein u denotes 0 or 1 and v denotes an integer of 1-16;
v)

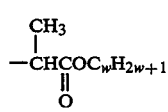

wherein w denotes an integer of 1-15 (optically active or inactive);
vi)

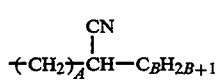

wherein A denotes an integer of 0-2 and B denotes an integer of 1-15 (optically active or inactive); and
vii)

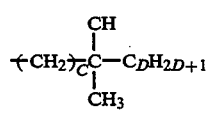

wherein C denotes an integer of 0-2 and D denotes an integer of 1-15 (optically active or inactive).

In the above-mentioned formula (III), more preferred compounds thereof may include those represented by the formulas (IIIaa) to (IIIdc):

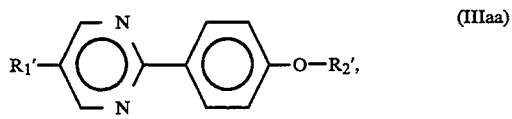
(IIIaa)

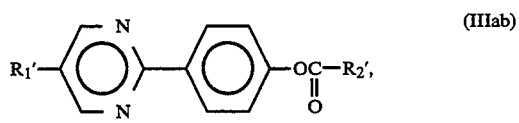
(IIIab)

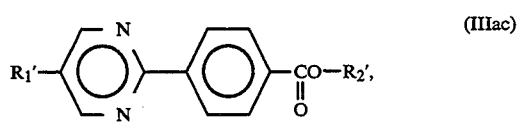
(IIIac)

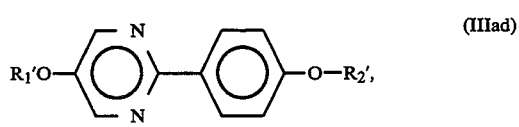
(IIIad)

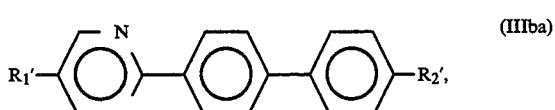
(IIIba)

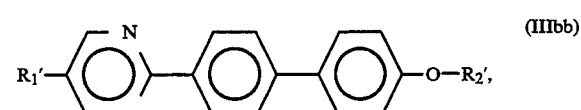
(IIIbb)

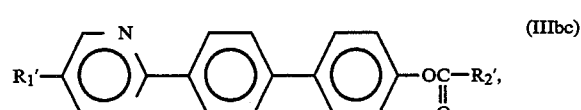
(IIIbc)

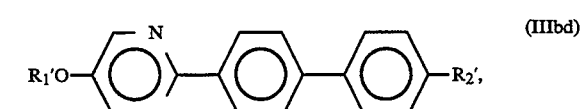
(IIIbd)

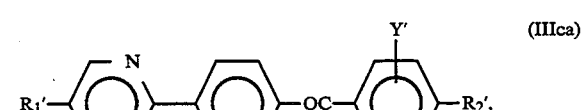
(IIIca)

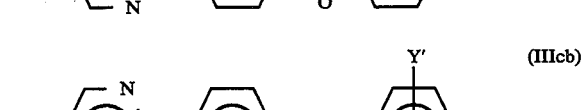
(IIIcb)

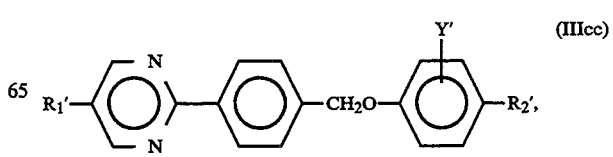
(IIIcc)

-continued
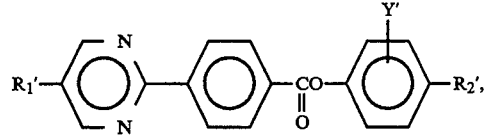 (IIIcd)
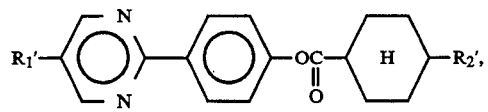 (IIIda)
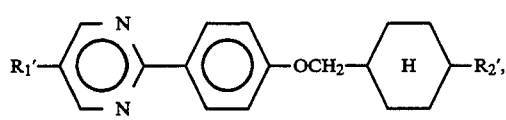 (IIIdb)
and
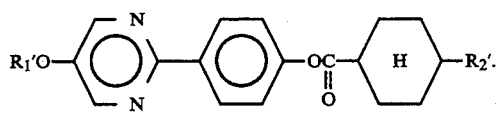 (IIIdc)
In the above-mentioned formula (IV), more preferred compounds thereof may include those represented by the formulas (IVaa) to (IVcd):
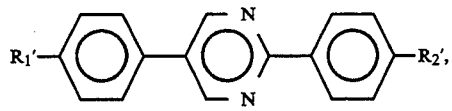 (IVaa)
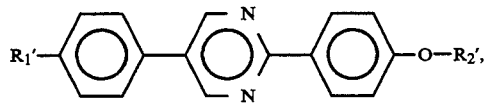 (IVab)
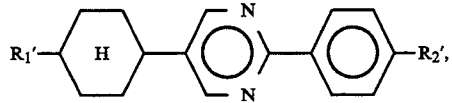 (IVba)
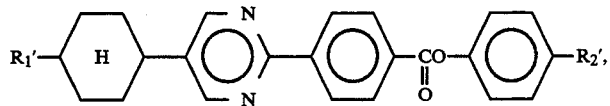 (IVca)
and
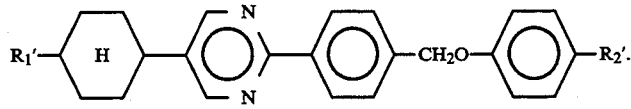 (IVcb)
In the above-mentioned formula (V), more preferred compounds thereof may include those represented by the formulas (Vaa) to (Vbf):
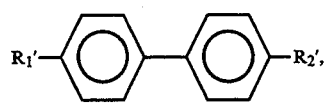 (Vaa)
-continued
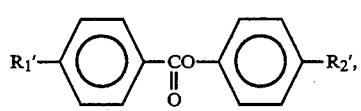 (Vab)
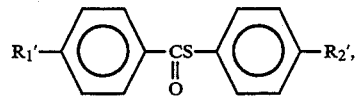 (Vac)
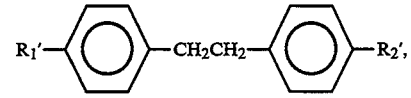 (Vad)
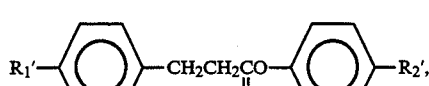 (Vae)
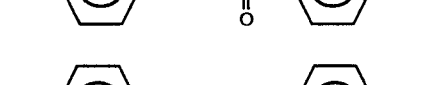 (Vaf)
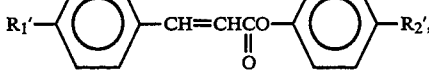 (Vag)
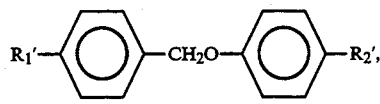 (Vah)
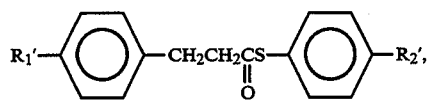

-continued

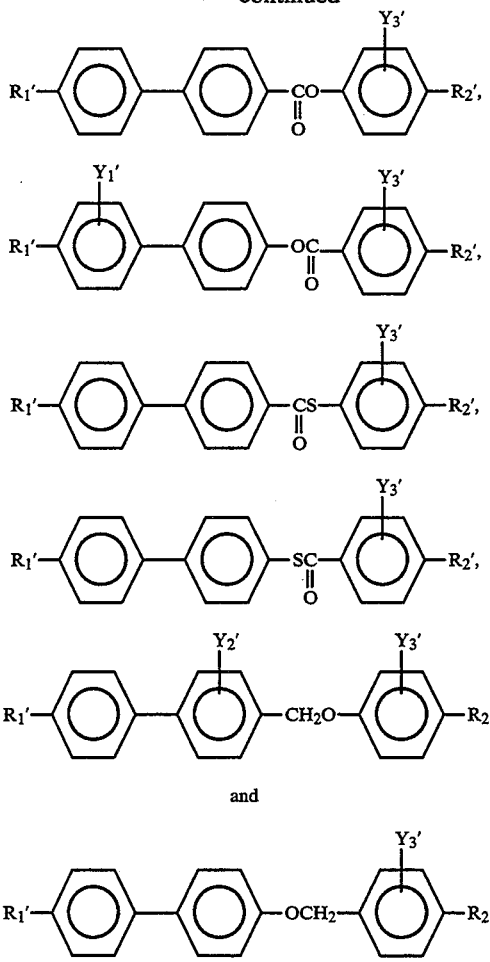

In the above-mentioned formula (VI), more preferred compounds thereof may include those represented by the formulas (VIaa) to (VIfa):

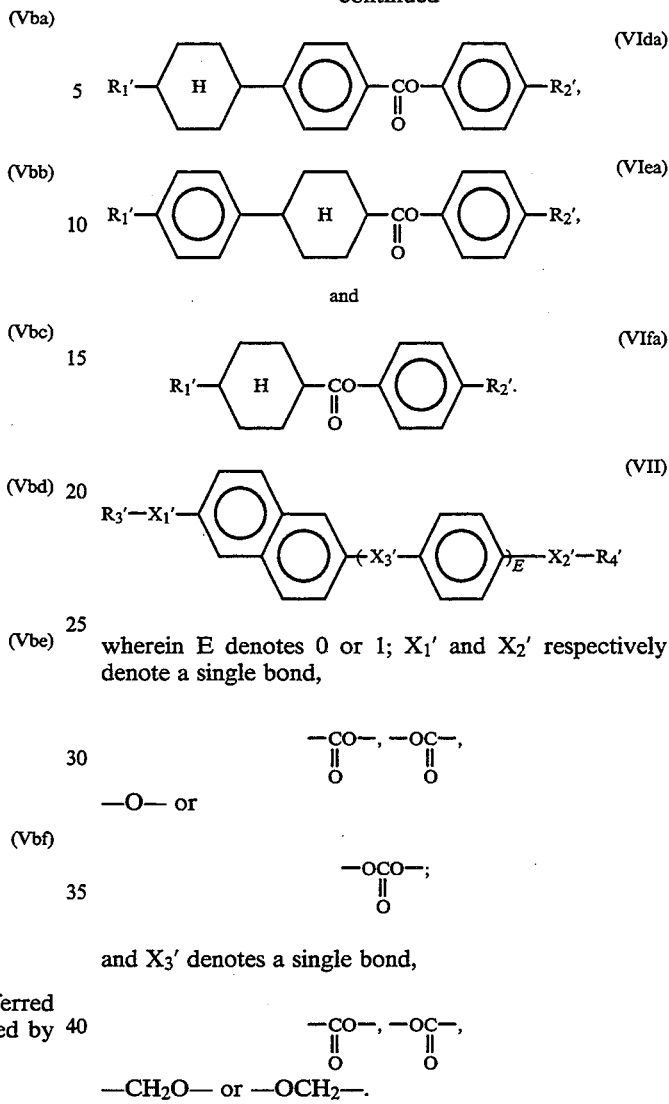

wherein E denotes 0 or 1; $X_1'$ and $X_2'$ respectively denote a single bond,

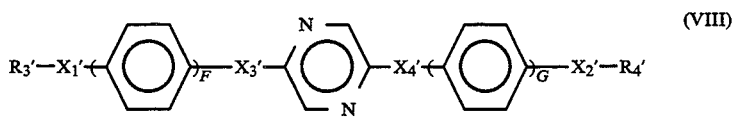

—O— or

—OCO—;
  ‖
  O and $X_3'$ denotes a single bond,

—CO—, —OC—,
 ‖      ‖
 O      O

—CH$_2$O— or —OCH$_2$—.

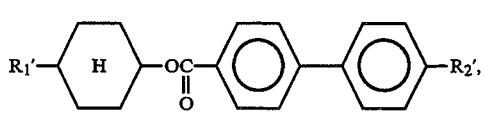
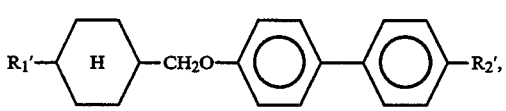
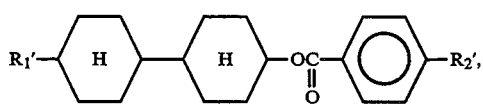
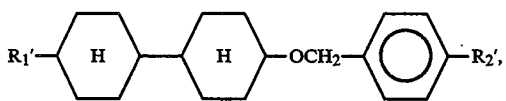

wherein F and G respectively denote 0 or 1; $X_1'$ and $X_2'$ respectively denote a single bond,

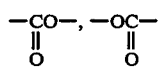

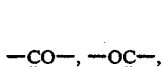

or —O—; and $X_3'$ and $X_4'$ respectively denote a single bond,

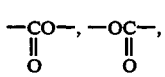

—CH₂O— or —OCH₂—.

In the above formula (VII), preferred compounds thereof may include those represented by the following formulas (VIIa) and (VIIb):

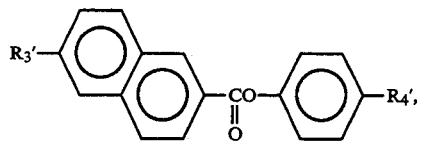
(VIIa)

and

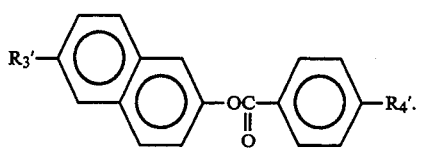
(VIIb)

In the above formula (VIII), preferred compounds thereof may include those represented by the following formulas (VIIIa) and (VIIIb).

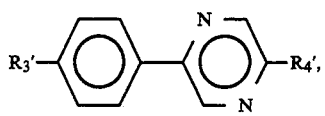
(VIIIa)

and

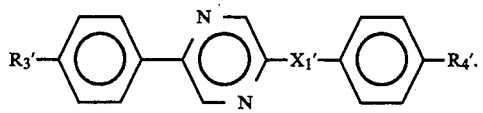
(VIIIb)

More preferred compounds of the formula (VIII) may include those represented by the formulas (VIIIaa) to (VIIIbb):

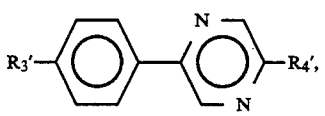
(VIIIaa)

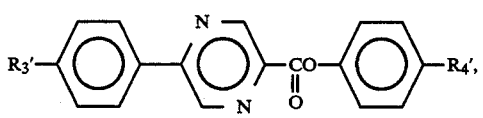
(VIIIba)

and

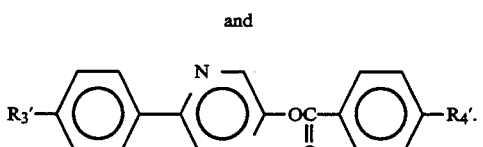
(VIIIbb)

Herein, $R_3'$ and $R_4'$ respectively denote a linear or branched alkyl group having 1–18 carbon atoms capable of including one or two or more non-neighboring methylene groups which can be replaced with —CH halogen- and capable of further including one or two or more non-neighboring methylene groups other than those directly connected to $X_1'$ or $X_2'$ which can be replaced with at least one species of —O—,

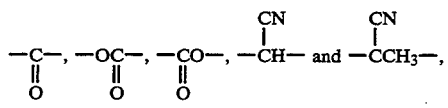

with proviso that $R_3'$ and $R_4'$ respectively do not connect to a ring structure by a single bond when $R_3'$ and $R_4'$ respectively denote a halogenated alkyl group containing one methylene group replaced with —CH halogen-.

Further, preferred examples of $R_3'$ and $R_4'$ may respectively include those represented by the following groups (i) to (vii):

i) a linear alkyl group having 1–15 carbon atoms;

ii)

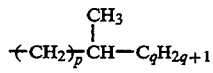

wherein p denotes an integer of 0–5 and q denotes an integer of 1–11 (optically active or inactive);

iii)

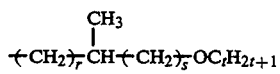

wherein r denotes an integer of 0–6, s denotes 0 or 1, and t denotes an integer of 1–14 (optically active or inactive);

iv)

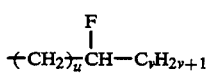

wherein u denotes an integer of 0 or 1 and v denotes an integer of 1–16;

v)

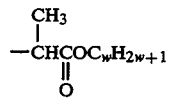

wherein w denotes an integer of 1–15 (optically active or inactive);

vi)

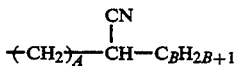

wherein A denotes an integer of 0–2 and B denotes an integer of 1–15 (optically active or inactive); and vii)

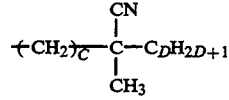

wherein C denotes an integer of 0–2 and D denotes an integer of 1–15 (optically active or inactive).

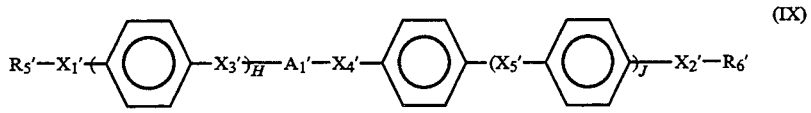 (IX)

wherein H and J respectively denote 0 or 1 with proviso that H+J=0 or 1; $X_1'$ and $X_2'$ respectively denote a single bond,

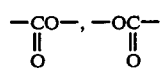

or —O—; $A_1'$ denotes

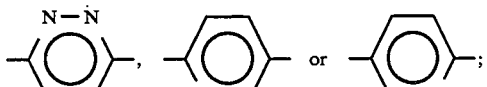

and $X_3'$ and $X_4'$ respectively denote a single bond,

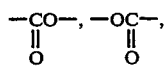

—CH$_2$O— or —OCH$_2$—.

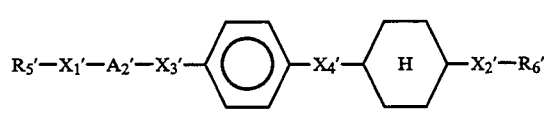 (X)

wherein $X_1'$ and $X_2'$ respectively denote a single bond,

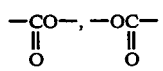

or —O—; $A_2'$ denotes

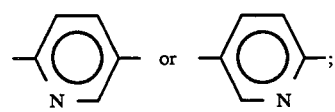

and $X_3'$ and $X_4'$ respectively denote a single bond,

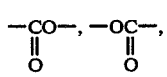

—CH$_2$O— or —OCH$_2$—.

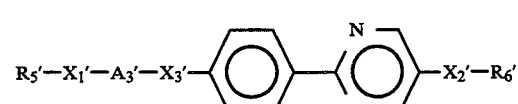 (XI)

wherein $X_1'$ and $X_2'$ respectively denote a single bond,

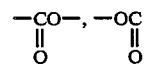

or —O—; $A_3'$ denote

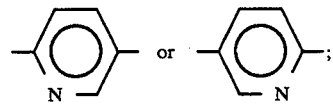

and $X_3'$ respectively denotes a single bond,

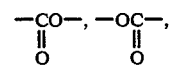

—CH$_2$O— or —OCH$_2$—,

In the above formula (IX), preferred compounds thereof may include those represented by the following formulas (IXa) to (IXc):

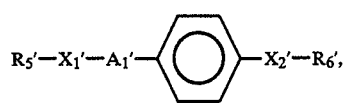 (IXa)

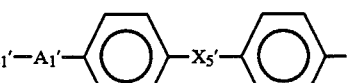 (IXb)

and

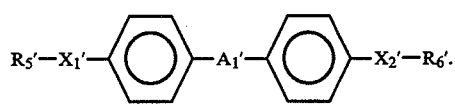 (IXc)

In the above formula (X), preferred compounds thereof may include those represented by the following formulas (Xa) and (Xb):

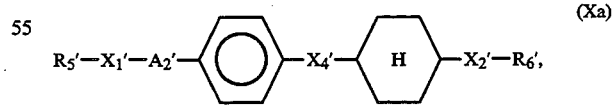 (Xa)

and

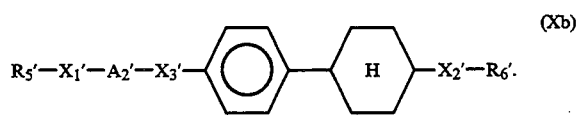 (Xb)

In the above-mentioned formula (IX), more preferred compounds thereof may include those represented by the formulas (IXaa) to (IXcc):

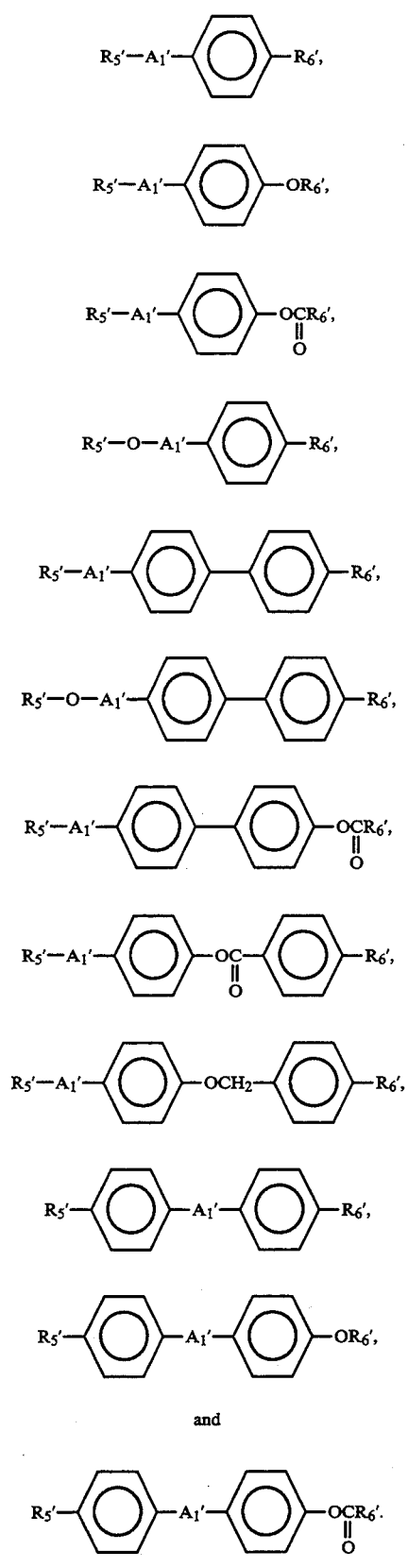
In the above-mentioned formula (X), more preferred compounds thereof may include those represented by the formulas (Xaa) to (Xbb):
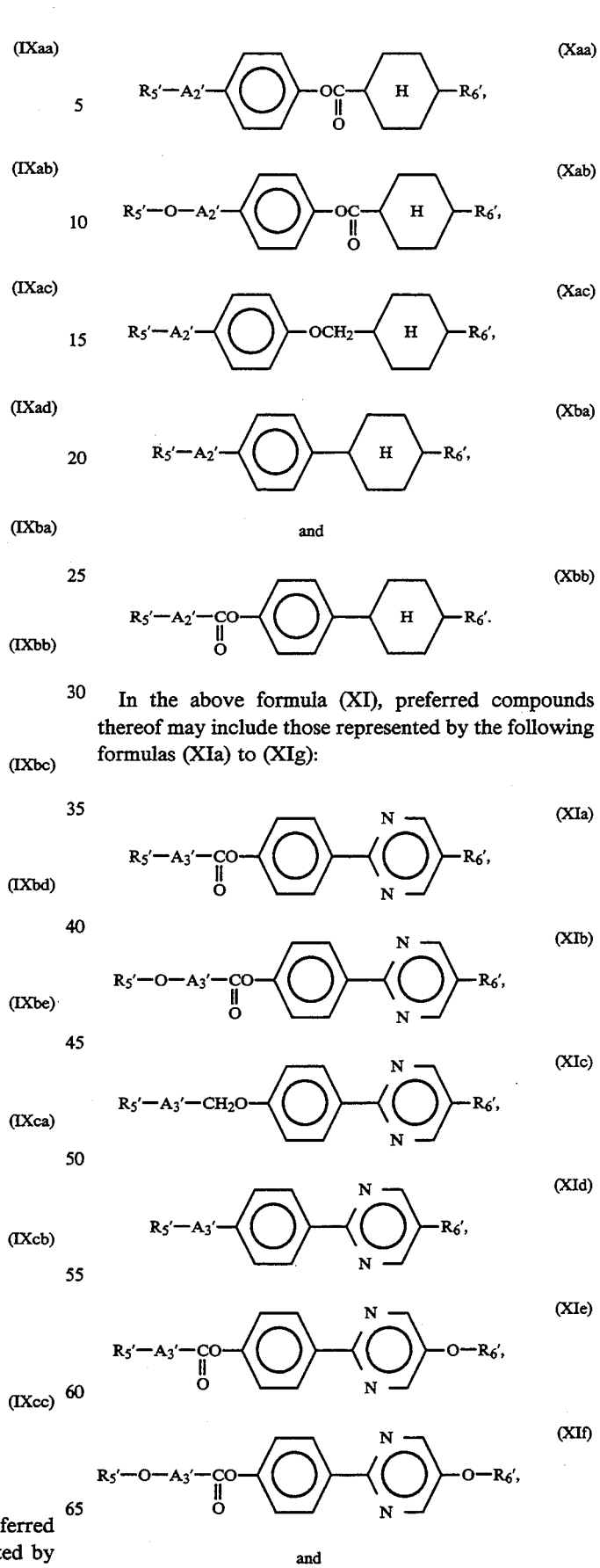
In the above formula (XI), preferred compounds thereof may include those represented by the following formulas (XIa) to (XIg):
and -continued

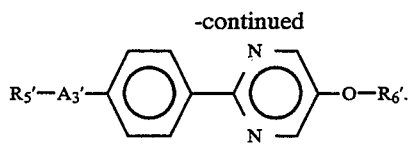 (XIg)

Herein, $R_5'$ and $R_6'$ respectively denote a linear or branched alkyl group having 1-18 carbon atoms capable of including one or two or more non-neighboring methylene groups other than those directly connected to $X_1'$ or $X_2'$ which can be replaced with at least one species of —O—, —C—, —OC—, —CO—,

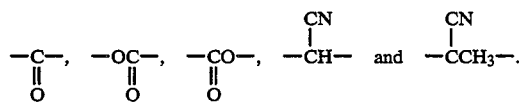

Further, preferred examples of $R_5'$ and $R_6'$ may respectively include those represented by the following groups (i) to (vi):

i) a linear alkyl group having 1-15 carbon atoms;

ii)
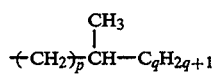

wherein p denotes an integer of 0-5 and q denotes an integer of 1-11 (optically active or inactive);

iii)
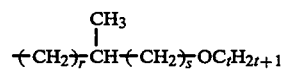

wherein r denotes an integer of 0-6, s denotes 0 or 1, and t denotes an integer of 1-14 (optically active or inactive);

iv)
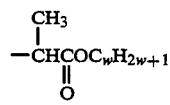

wherein w denotes an integer of 1-15 (optically active or inactive);

v)
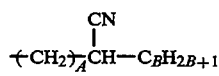

wherein A denotes an integer of 0-2 and B denotes an integer of 1-15 (optically active or inactive); and vi)
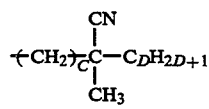

wherein C denotes an integer of 0-2 and D denotes an integer of 1-15 (optically active or inactive).

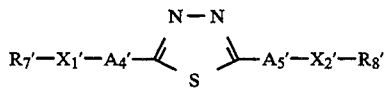 (XII)

wherein $R_7'$ and $R_8'$ respectively denote a linear alkyl group having 1-18 carbon atoms; $X_1'$ and $X_2'$ respectively denote a single bond,

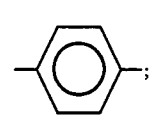

or —O—; $A_4'$ denotes a single bond or

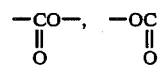

and $A_5'$ denotes

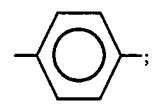

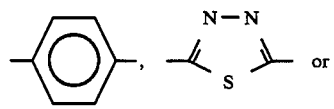

In the above formula (XII), preferred compounds thereof may include those represented by the following formulas (XIIa) and (XIIb):

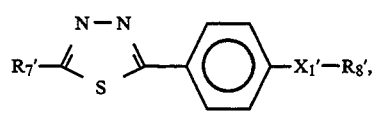 (XIIa)

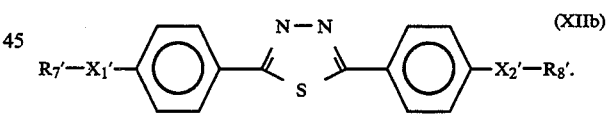 (XIIb)

In formulating the liquid crystal composition according to the present invention, the liquid crystal composition may desirably contain 1-80 wt. %, preferably 1-60 wt. %, more preferably 1-40 wt. % of a mesomorphic compound represented by the formula (I).

Further, when two or more species of the compounds represented by the formula (I) are used, the liquid crystal composition may desirably contain 1-80 wt. %, preferably 1-60 wt. %, more preferably 1-40 wt. %, of the two or more species of the compounds represented by the formula (I).

The liquid crystal device according to the present invention may preferably be prepared by heating the liquid crystal composition assuming a chiral smectic phase prepared as described above into an isotropic liquid under vacuum, filling a blank cell comprising a pair of oppositely spaced electrode plates with the composition, gradually cooling the cell to form a liquid crystal layer and restoring the normal pressure.

FIG. 1 is a schematic sectional view of an embodiment of the liquid crystal device utilizing ferroelectricity prepared as described above for explanation of the structure thereof.

Referring to FIG. 1, the liquid crystal device includes a liquid crystal layer 1 assuming a chiral smectic phase disposed between a pair of glass substrates 2 each having thereon a transparent electrode 3 and an insulating alignment control layer 4. Lead wires 6 are connected to the electrodes so as to apply a driving voltage to the liquid crystal layer 1 from a power supply 7. Outside the substrates 2, a pair of polarizers 8 are disposed so as to modulate incident light $I_0$ from a light source 9 in cooperation with the liquid crystal 1 to provide modulated light I.

Each of two glass substrates 2 is coated with a transparent electrode 3 comprising a film of $In_2O_3$, $SnO_2$ or ITO (indium-tin-oxide) to form an electrode plate. Further thereon, an insulating alignment control layer 4 is formed by rubbing a film of a polymer such as polyimide with gauze or acetate fiber-planted cloth so as to align the liquid crystal molecules in the rubbing direction. Further, it is also possible to compose the alignment control layer of two layers, e.g., by first forming an insulating layer of an inorganic material, such as silicon nitride, silicon nitride containing hydrogen, silicon carbide, silicon carbide containing hydrogen, silicon oxide, boron nitride, boron nitride containing hydrogen, cerium oxide, aluminum oxide, zirconium oxide, titanium oxide, or magnesium fluoride, and forming thereon an alignment control layer of an organic insulating material, such as polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin, acrylic resin, or photoresist resin. Alternatively, it is also possible to use a single layer of inorganic insulating alignment control layer or organic insulating alignment control layer. An inorganic insulating alignment control layer may be formed by vapor deposition, while an organic insulating alignment control layer may be formed by applying a solution of an organic insulating material or a precursor thereof in a concentration of 0.1 to 20 wt. %, preferably 0.2–10 wt. %, by spinner coating, dip coating, screen printing, spray coating or roller coating, followed by curing or hardening under prescribed hardening condition (e.g., by heating). The insulating alignment control layer may have a thickness of ordinarily 30 Å–1 micron, preferably 30–3000 Å, further preferably 50–1000 Å. The two glass substrates 2 with transparent electrodes 3 (which may be inclusively referred to herein as "electrode plates") and further with insulating alignment control layers 4 thereof are held to have a prescribed (but arbitrary) gap with a spacer 5. For example, such a cell structure with a prescribed gap may be formed by sandwiching spacers of silica beads or alumina beads having a prescribed diameter with two glass plates, and then sealing the periphery thereof with, e.g., an epoxy adhesive. Alternatively, a polymer film or glass fiber may also be used as a spacer. Between the two glass plates, a liquid crystal assuming a chiral smectic phase is sealed up to provide a liquid crystal layer 1 in a thickness of generally 0.5 to 20 microns, preferably 1 to 5 microns.

The liquid crystal provided by the composition of the present invention may desirably assume a SmC* phase (chiral smectic C phase) in a wide temperature range including room temperature (particularly, broad in a lower temperature side) and also shows wide drive voltage margin when contained in a device.

Particularly, in order to show a good alignment characteristic to form a uniform monodomain, the liquid crystal may show a phase transition series comprising isotropic phase—Ch phase (cholesteric phase)—SmA phase (smectic A phase)—SmC* phase (chiral smectic C phase) on temperature decrease.

The transparent electrodes 3 are connected to the external power supply 7 through the lead wires 6. Further, outside the glass substrates 2, polarizers 8 are applied. The device shown in FIG. 1 is of a transmission type and is provided with a light source 9.

Figure 2:
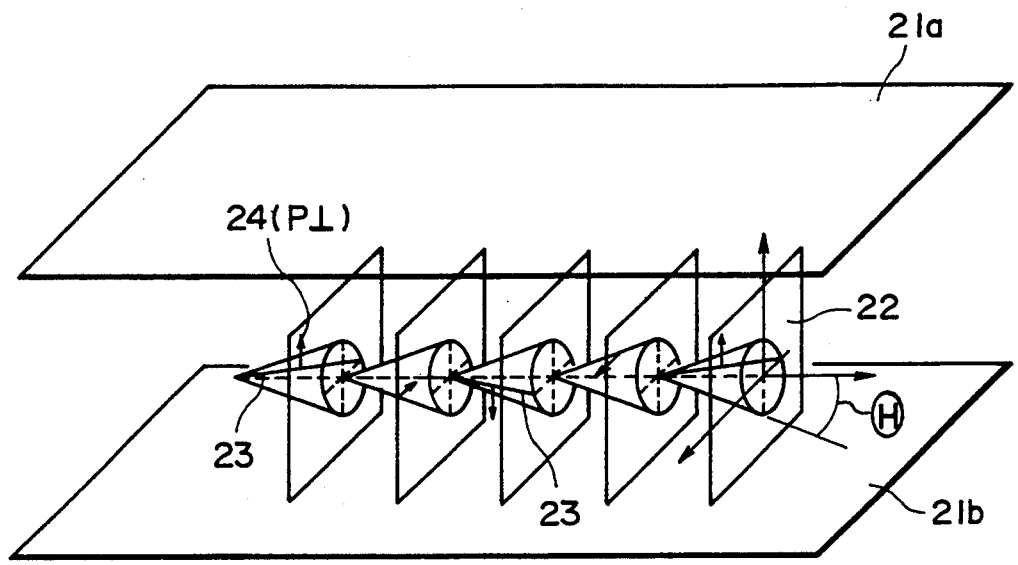
FIGS. 2 and 3 are schematic perspective views of a device cell embodiment for illustrating the operation principle of a liquid crystal device utilizing ferroelectricity of a liquid crystal composition.

FIG. 2 is a schematic illustration of a liquid crystal cell (device) utilizing ferroelectricity for explaining operation thereof. Reference numerals 21a and 21b denote substrates (glass plates) on which a transparent electrode of, e.g., $In_2O_3$, $SnO_2$, ITO (indium-tin-oxide), etc., is disposed, respectively. A liquid crystal of an SmC*-phase (chiral smectic C phase) or SmH*-phase (chiral smectic H phase) in which liquid crystal molecular layers 22 are aligned perpendicular to surfaces of the glass plates is hermetically disposed therebetween. Full lines 23 show liquid crystal molecules. Each liquid crystal molecule 23 has a dipole moment (P⊥) 24 in a direction perpendicular to the axis thereof. The liquid crystal molecules 23 continuously form a helical structure in the direction of extension of the substrates. When a voltage higher than a certain threshold level is applied between electrodes formed on the substrates 21a and 21b, a helical structure of the liquid crystal molecule 23 is unwound or released to change the alignment direction of respective liquid crystal molecules 23 so that the dipole moments (P⊥) 24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Figure 3:
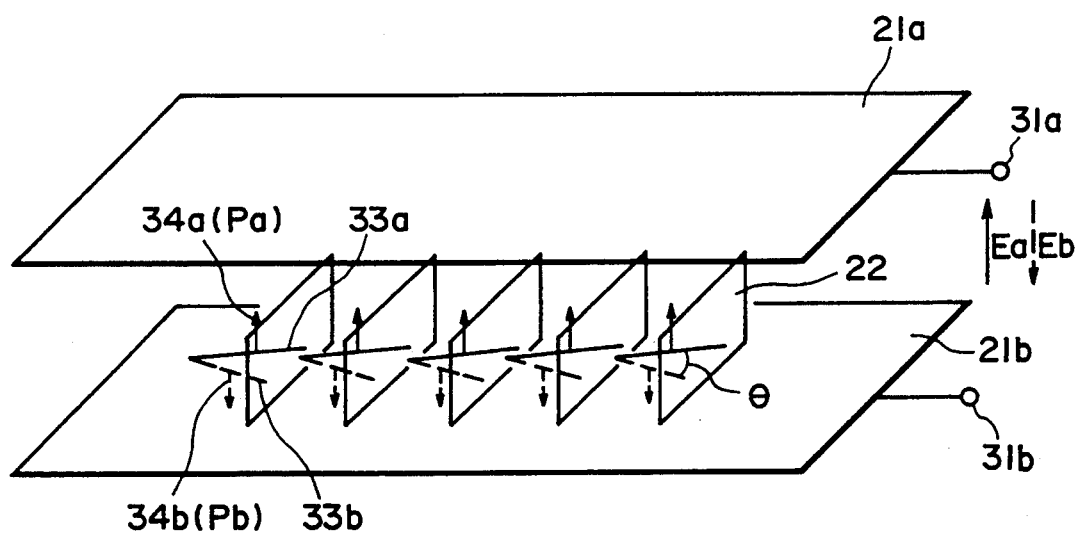
Figure 4:
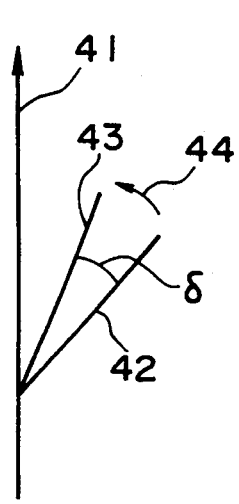
FIG. 4 is a schematic view illustrating a relationship among uniaxial alignment axes on a pair of substrates and axes of liquid crystal molecules adjacent to the substrate.
Figure 5A:
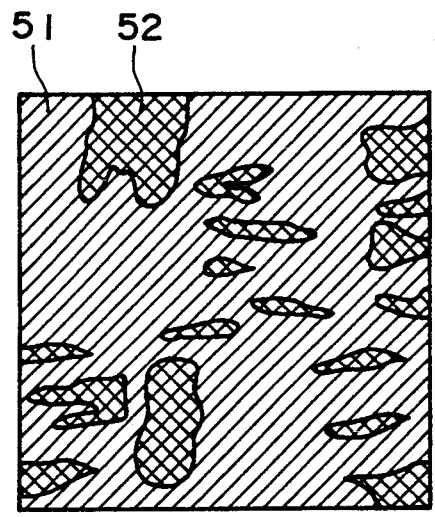
FIGS. 5A–5E are schematic views showing alignment states of a ferroelectric liquid crystal varying depending on temperature.
Figure 5B:
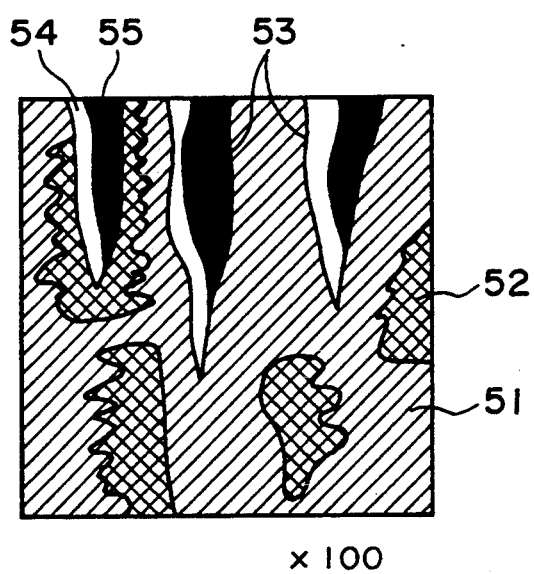
Figure 5C:
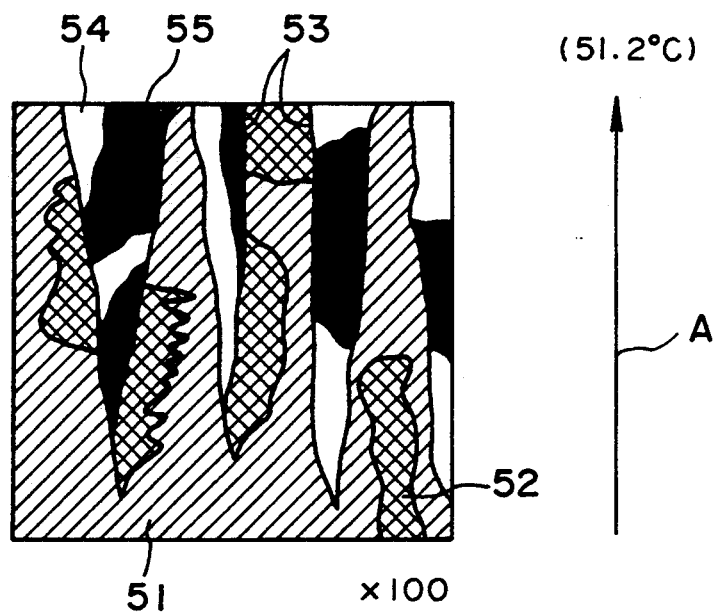
Figure 5D:
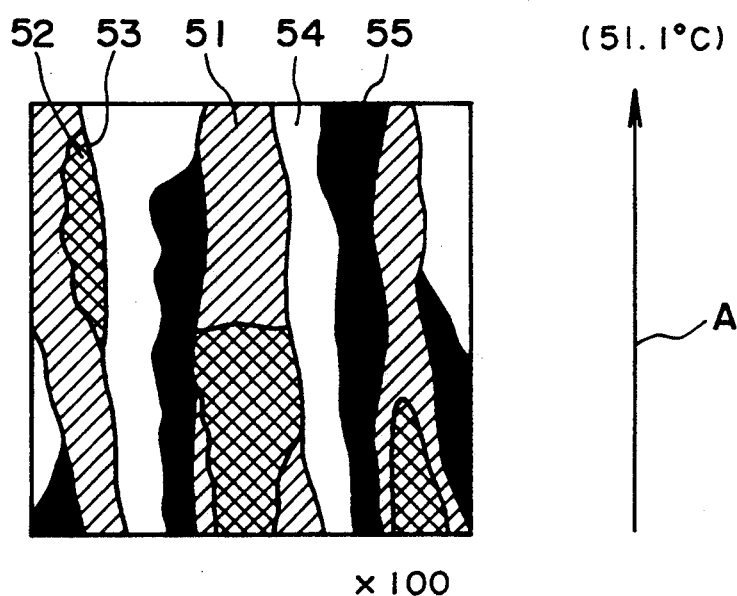
Figure 5E:
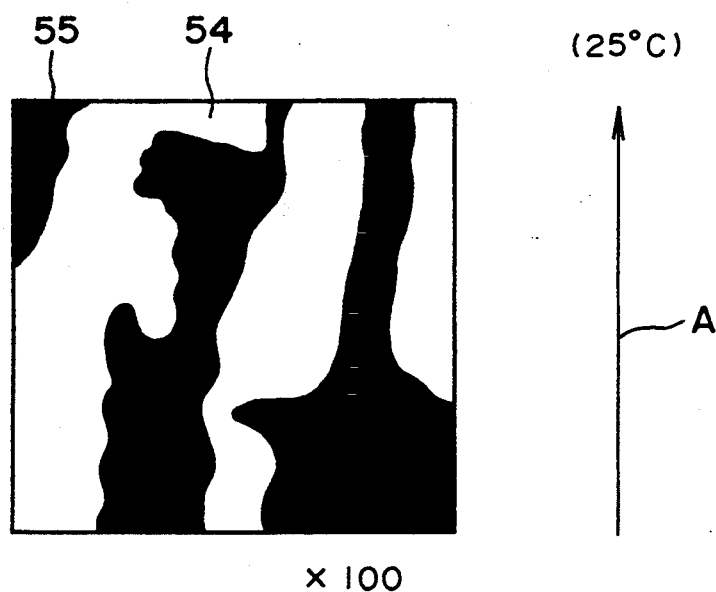
Figure 6:
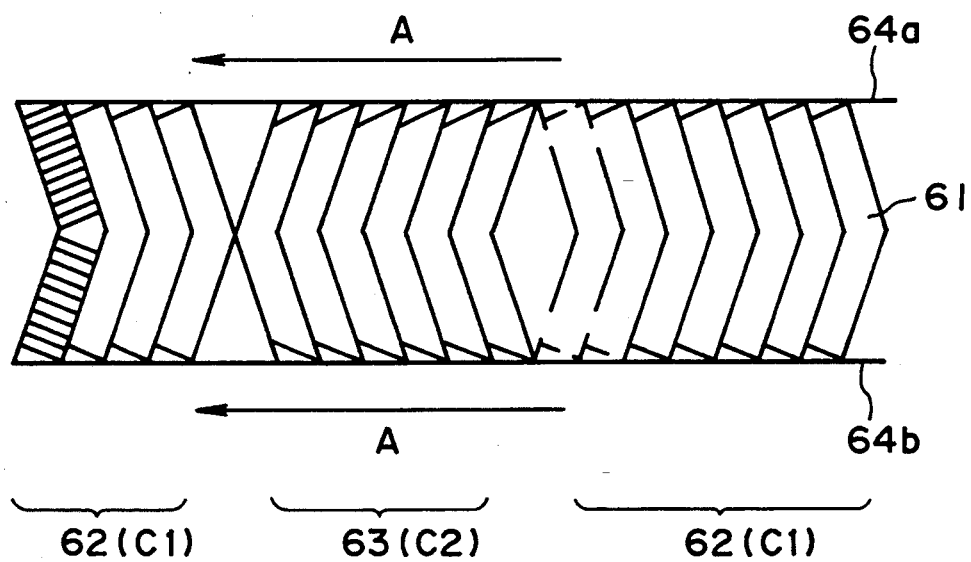
FIG. 6 is a schematic sectional view across the thickness of a ferroelectric liquid crystal device illustrating alignment states.

Further, when the liquid crystal cell is made sufficiently thin (e.g., less than about 10 microns), the helical structure of the liquid crystal molecules is unwound to provide a non-helical structure even in the absence of an electric field, whereby the dipole moment assumes either of the two states, i.e., Pa in an upper direction 34a or Pb in a lower direction 34b as shown in FIG. 3, thus providing a bistable condition. When an electric field Ea or Eb higher than a certain threshold level and different from each other in polarity as shown in FIG. 3 is applied to a cell having the above-mentioned characteristics by using voltage application means 31a and 31b, the dipole moment is directed either in the upper direction 34a or in the lower direction 34b depending on the vector of the electric field Ea or Eb. In correspondence with this, the liquid crystal molecules are oriented in either of a first stable state 33a and a second stable state 33b.

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g., with reference to FIG. 3. When the electric field Ea is applied to the liquid crystal molecules, they are oriented in the first stable state 33a. This state is stably retained even if the electric field is removed. On the other hand, when the electric field Eb of which direction is opposite to that of the electric field Ea is applied thereto, the liquid crystal molecules are oriented to the second stable state 33b, whereby the directions of molecules are changed. This state is similarly stably retained even if the electric field is removed. Further, as long as the magnitude of the electric field Ea or Eb being applied is not above a certain threshold value, the liquid crystal molecules are placed in the respective orientation states.

When the chiral smectic liquid crystal composition according to the present invention is used in combination with an insulating alignment control layer providing a high pre-tilt angle, there is provided a liquid crystal device providing a high-contrast image with a high transmittance and having a good switching characteristic free of standing monostabilization. Here, "pre-tilt angle" is defined as an angle between a director of liquid crystal molecules and liquid crystal aligning surfaces of a liquid crystal cell. The higher pre-tilt angle used herein may refer to 6–30 degrees, preferably 8–30 degrees, more preferably 10–30 degrees. Further, examples of the insulating alignment control layer providing a high pre-tilt angle may include polyimide films disclosed in, e.g., EP-A-0400635.

Herein, the pre-tilt angle is measured by the crystal rotation method (Jpn. J. Appl. Phy. Vol. 19 (1980), No. 10, Short Notes 2013) and using a cell containing a 20 micron-thick layer of liquid crystal in smectic A phase.

Figure 8:
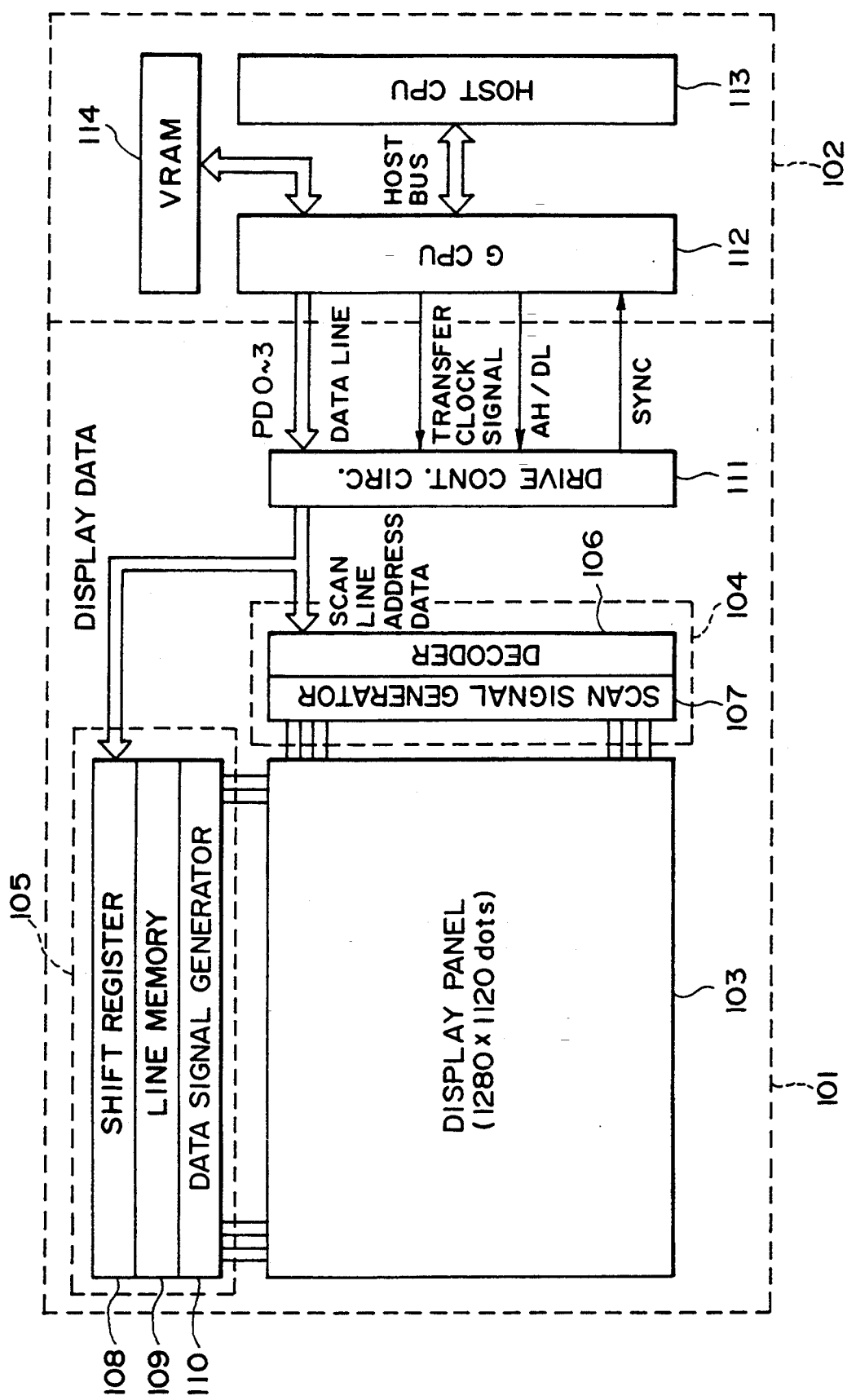
FIG. 8 is a block diagram showing a display apparatus comprising a liquid crystal device utilizing ferroelectricity of a liquid crystal composition and a graphic controller.
Figure 9:
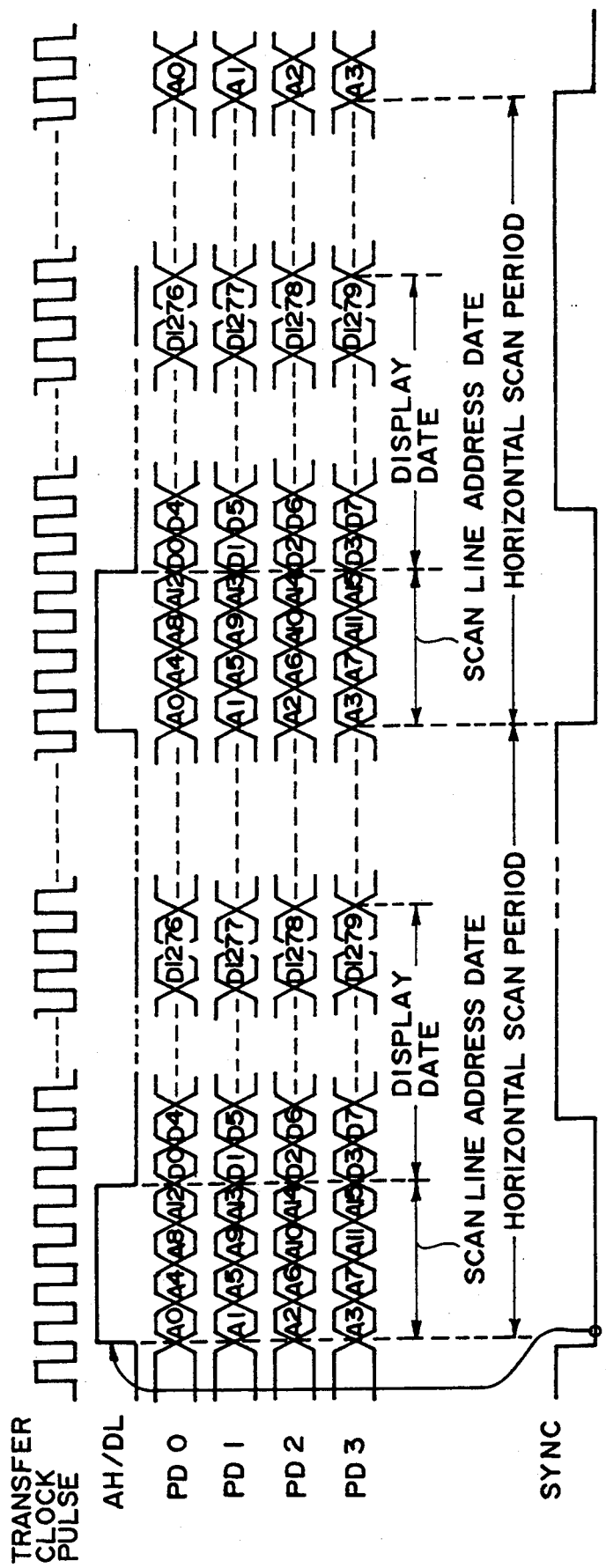
FIG. 9 is a time chart of image data communication showing time correlation between signal transfer and driving with respect to a liquid crystal display apparatus and a graphic controller.

Based on the arrangement and data format comprising image data accompanied with scanning line address data and by adopting communication synchronization using a SYNC signal as shown in FIGS. 8 and 9, there is provided a liquid crystal display apparatus of the present invention which uses the liquid crystal device according to the present invention as a display panel.

Referring to FIG. 8, the ferroelectric liquid crystal display apparatus 101 includes a graphic controller 102, a display panel 103, a scanning line drive circuit 104, a data line drive circuit 105, a decoder 106, a scanning signal generator 107, a shift resistor 108, a line memory 109, a data signal generator 110, a drive control circuit 111, a graphic central processing unit (GCPU) 112, a host central processing unit (host CPU) 113, and an image data storage memory (VRAM) 114.

Image data are generated in the graphic controller 102 in an apparatus body and transferred to a display panel 103 by signal transfer means shown in FIGS. 8 and 9. The graphic controller 102 principally comprises a CPU (central processing unit, hereinafter referred to as "GCPU") 112 and a VRAM (video-RAM, image data storage memory) 114 and is in charge of management and communication of image data between a host CPU 113 and the liquid crystal display apparatus (FLCD) 101. The control of the display apparatus is principally realized in the graphic controller 102. A light source is disposed at the back of the display panel 103.

Hereinbelow, the present invention will be explained more specifically with reference to examples. It is however to be understood that the present invention is not restricted to these examples.

EXAMPLE 1

A liquid crystal composition 1-A was prepared by mixing the following compounds in respectively indicated proportions.

| Structural formula | wt. parts |
|---|---|
| n-C$_8$H$_{17}$—⟨○⟩—CO—⟨○⟩—⟨○⟩—OCH$_2$CHC$_2$H$_5$ (CH$_3$) * ‖ O | 15 |
| n-C$_3$H$_7$OCH(CH$_3$)(CH$_2$O)$_3$—⟨○⟩—CO—⟨○⟩—⟨○⟩—OC$_6$H$_{13}$-n * ‖ O | 5 |
| n-C$_3$H$_7$OCH(CH$_3$)(CH$_2$)$_3$O—⟨○⟩—CO—⟨○⟩—⟨○⟩—COC$_6$H$_{13}$-n * ‖ O | 10 |
| n-C$_{10}$H$_{21}$O—⟨○⟩—CO—⟨○⟩—OC$_8$H$_{17}$-n ‖ O | 6 |
| n-C$_8$H$_{17}$—⟨○⟩—CO—⟨○⟩—OC$_{10}$H$_{21}$-n ‖ O | 8 |
| n-C$_{10}$H$_{21}$O—⟨○⟩—CO—⟨○⟩—OC$_6$H$_{13}$-n ‖ O | 6 |

-continued

| Structural formula | wt. parts |
|---|---|
| 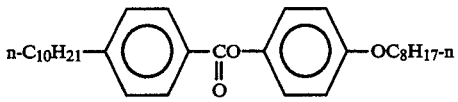 | 12 |
| 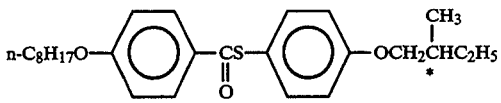 | 6 |
| 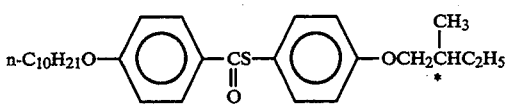 | 9 |
| 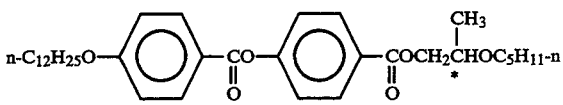 | 10 |
| 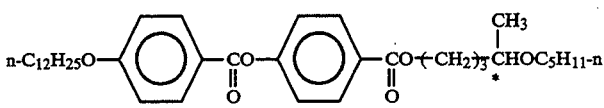 | 5 |
| 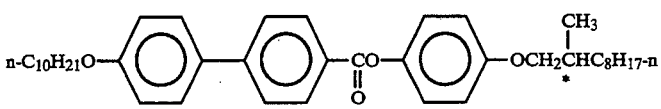 | 3 |
| 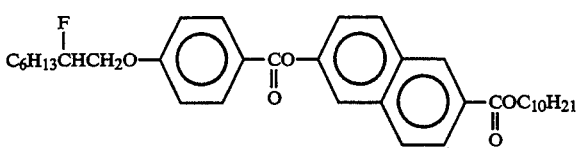 | 5 |

The liquid crystal composition 1-A was further mixed with the following Example Compounds in the proportions indicated below to provide a liquid crystal composition 1-B.

| Ex. Comp. No. | Structural formula | wt. parts |
|---|---|---|
| 6 | 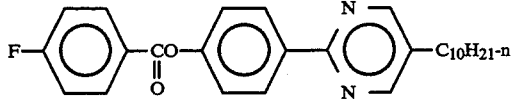 | 5 |
| 64 | 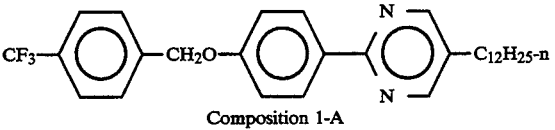 | 1 |
| | Composition 1-A | 94 |

Two 1.1 mm-thick glass plates were provided and respectively coated with an ITO film to form an electrode for voltage application, which was further coated with an insulating layer of vapor-deposited $SiO_2$.

Further, each glass plate provided with an ITO film and treated in the above described manner was coated with a 1.0%-solution of polyimide resin precursor (SP-710, available from Toray K. K.) in dimethylacetoamide by a spinner coater rotating at 2500 rpm for 15 seconds. Thereafter, the coating film was subjected to heat curing at 300° C. for 60 min. to obtain about 200 Å-thick film. The coating film was rubbed with acetate fiber-planted cloth. The thus treated two glass plates were washed with isopropyl alcohol. After silica beads with an average particle size of 1.5 microns were dispersed on one of the glass plates, the two glass plates were applied to each other with a bonding sealing agent (Lixon Bond, available from Chisso K. K.) so that their rubbed directions were parallel to each other and heated at 100° C. for 60 min. to form a blank cell.

Then, each of the liquid crystal compositions 1-A and 1-B prepared above was heated into an isotropic liquid, and injected into the above prepared cell under vacuum and, after sealing, was gradually cooled at a rate of 20°

C./hour to 25° C. to prepare a ferroelectric liquid crystal device.

The resultant ferroelectric liquid crystal devices were respectively subjected to measurement of an optical response time (time from voltage application until the transmittance change reaches 90% of the maximum under the application of a peak-to-peak voltage Vpp of 20 V in combination with right-angle cross-nicol polarizers).

The results are shown below.

| Composition | Response time (μsec) | | |
|---|---|---|---|
| | 10° C. | 25° C. | 40° C. |
| 1-A | 1360 | 430 | 147 |

| Composition | Response time (μsec) | | |
|---|---|---|---|
| | 10° C. | 25° C. | 40° C. |
| 1-B | 970 | 321.1 | 111.7 |

As is apparent from the above results, the ferroelectric liquid crystal device using the liquid crystal composition 1-B containing the mesomorphic compounds represented by the formula (I) showed an improved response time.

EXAMPLE 2

A liquid crystal composition 2-A was prepared by mixing the following compounds in respectively indicated proportions.

| Structural formula | wt. parts |
|---|---|
| n-$C_8H_{17}$—〈Ph〉—CO-O—〈Ph〉—〈Ph〉—O$CH_2$$\overset{*}{C}H(CH_3)C_2H_5$ | 15 |
| n-$C_3H_7O\overset{*}{C}H(CH_3)$—$(CH_2)_3$—O—〈Ph〉—CO-O—〈Ph〉—〈Ph〉—O$C_6H_{13}$-n | 5 |
| n-$C_3H_7O\overset{*}{C}H(CH_3)$—$(CH_2)_3$—O—〈Ph〉—CO-O—〈Ph〉—〈Ph〉—CO-O$C_6H_{13}$-n | 10 |
| n-$C_{10}H_{21}O$—〈Ph〉—CO-O—〈Ph〉—O$C_8H_{17}$-n | 5 |
| n-$C_8H_{17}$—〈Ph〉—CO-O—〈Ph〉—O$C_{10}H_{21}$-n | 8 |
| n-$C_{10}H_{21}O$—〈Ph〉—CO-O—〈Ph〉—O$C_6H_{13}$-n | 5 |
| n-$C_{10}H_{21}$—〈Ph〉—CO-O—〈Ph〉—O$C_8H_{17}$-n | 12 |
| n-$C_8H_{17}O$—〈Ph〉—CS-O—〈Ph〉—O$CH_2\overset{*}{C}H(CH_3)C_2H_5$ | 9 |
| n-$C_{10}H_{21}O$—〈Ph〉—CS-O—〈Ph〉—O$CH_2\overset{*}{C}H(CH_3)C_2H_5$ | 6 |
| n-$C_4H_9OCH_2\overset{*}{C}H(CH_3)O$—〈Ph〉—CO-O—〈Ph〉—〈Ph〉—CO-O$C_8H_{17}$-n | 5 |

| Structural formula | wt. parts |
|---|---|
| n-$C_{12}H_{25}$O—⟨⟩—CO—O—⟨⟩—COCH$_2$CH(CH$_3$)OC$_5$H$_{11}$-n * | 15 |
| n-$C_{12}H_{25}$O—⟨⟩—CO—O—⟨⟩—CO—(CH$_2$)$_3$—CH(CH$_3$)OC$_5$H$_{11}$-n * | 5 |

The liquid crystal composition 2-A was further mixed with the following Example Compounds in the proportions indicated below to provide a liquid crystal composition 2-B.

| Ex. Comp. No. | Structural formula | wt. parts |
|---|---|---|
| 23 | CF$_3$—⟨⟩—CO—O—⟨⟩—⟨N,N-pyrazine⟩—$C_{14}H_{29}$-n | 5 |
| 55 | F—⟨⟩—CH$_2$O—⟨⟩—⟨N,N-pyrazine⟩—$C_7H_{15}$-n | 1 |
| 66 | CF$_3$—⟨⟩—CH$_2$O—⟨⟩—⟨N,N-pyrazine⟩—$C_8H_{17}$-n | 1 |
| 102 | Cl—⟨⟩—CO—O—⟨⟩—⟨N,N-pyrazine⟩—$C_{12}H_{25}$-n | 1 |
| | Composition 2-A | 92 |

Ferroelectric liquid crystal devices were prepared in the same manner as in Example 1 except for using the compositions 2-A and 2-B. The ferroelectric liquid crystal devices were subjected to measurement of response time in the same manner as in Example 1, whereby the following results were obtained.

| Composition | Response time (μsec) | | |
|---|---|---|---|
| | 10° C. | 25° C. | 40° C. |
| 2-A | 1410 | 435 | 155 |
| 2-B | 1015 | 292 | 101 |

As is apparent from the above results, the ferroelectric liquid crystal device using the liquid crystal composition 2-B containing the mesomorphic compounds represented by the formula (I) showed an improved response time.

EXAMPLE 3

A liquid crystal composition 3-A was prepared by mixing the following compounds in respectively indicated proportions.

| Structural formula | wt. parts |
|---|---|
| n-$C_{10}H_{21}$O—⟨⟩—CO—O—⟨⟩—OC$_8H_{17}$-n | 6 |
| n-$C_8H_{17}$—⟨⟩—CO—O—⟨⟩—OC$_{10}H_{21}$-n | 8 |

-continued

| Structural formula | wt. parts |
|---|---|
| n-C₁₀H₂₁O—⟨benzene⟩—CO(=O)—⟨benzene⟩—OC₆H₁₃-n | 9 |
| n-C₁₀H₂₁—⟨benzene⟩—CO(=O)—⟨benzene⟩—OC₈H₁₇-n | 12 |
| n-C₈H₁₇O—⟨benzene⟩—CS(=O)—⟨benzene⟩—CH₂C*H(CH₃)C₂H₅ | 3 |
| n-C₁₂H₂₅O—⟨benzene⟩—CS(=O)—⟨benzene⟩—CH₂C*H(CH₃)C₂H₅ | 3 |
| n-C₈H₁₇O—⟨benzene⟩—CS(=O)—⟨benzene⟩—OCH₂C*H(CH₃)C₂H₅ | 3 |
| n-C₁₀H₂₁O—⟨benzene⟩—CS(=O)—⟨benzene⟩—OCH₂C*H(CH₃)C₂H₅ | 3 |
| n-C₃H₇OC*H(CH₃)(CH₂)₃O—⟨benzene⟩—CO(=O)—⟨benzene⟩—⟨benzene⟩—COC₆H₁₃-n (=O) | 15 |
| n-C₄H₉OCH₂C*H(CH₃)O—⟨benzene⟩—CO(=O)—⟨benzene⟩—⟨benzene⟩—COC₈H₁₇-n (=O) | 15 |
| n-CH₃OC*H(CH₃)(CH₂)₂O—⟨benzene⟩—CO(=O)—⟨benzene⟩—⟨benzene⟩—COC₈H₁₇-n (=O) | 8 |
| n-C₁₂H₂₅O—⟨benzene⟩—CO(=O)—⟨benzene⟩—COCH₂C*H(CH₃)OC₅H₁₁-n (=O) | 9 |
| n-C₁₂H₂₅O—⟨benzene⟩—CO(=O)—⟨benzene⟩—CO(=O)(CH₂)₃C*H(CH₃)OC₅H₁₁-n | 6 |

The liquid crystal composition 3-A was further mixed with the following Example Compounds in the proportions indicated below to provide a liquid crystal composition 3-B.

| Ex. Comp. No. | Structural formula | wt. parts |
|---|---|---|
| 9 | 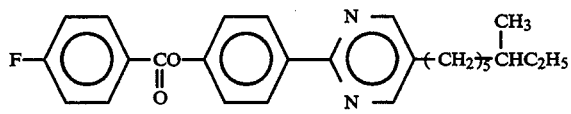 | 2 |

| Ex. Comp. No. | Structural formula | wt. parts |
|---|---|---|
| | -continued | |
| 23 | CF$_3$—⟨⟩—CO—O—⟨⟩—⟨N=N⟩—C$_{14}$H$_{29}$-n | 3 |
| 36 | F—⟨⟩—O—CO—⟨⟩—⟨N=N⟩—C$_3$H$_7$-n | 0.5 |
| 45 | CF$_3$—⟨⟩—O—CO—⟨⟩—⟨N=N⟩—C$_{10}$H$_{21}$-n | 0.5 |
| 58 | F—⟨⟩—CH$_2$O—⟨⟩—⟨N=N⟩—(CH$_2$)$_2$OC$_3$H$_7$-n | 1 |
| 66 | CF$_3$—⟨⟩—CH$_2$O—⟨⟩—⟨N=N⟩—C$_8$H$_{17}$-n | 1.5 |
| 84 | CF$_3$—⟨⟩—OCH$_2$—⟨⟩—⟨N=N⟩—C$_7$H$_{15}$-n | 0.5 |
| | Composition 3-A | 91 |

Ferroelectric liquid crystal devices were prepared in the same manner as in Example 1 except for using the compositions 3-A and 3-B. The ferroelectric liquid crystal devices were subjected to measurement of response time in the same manner as in Example 1, whereby the following results were obtained.

| | Response time (μsec) | | |
|---|---|---|---|
| Composition | 10° C. | 25° C. | 40° C. |
| 3-A | 1155 | 362 | 133 |
| 3-B | 798 | 253 | 97 |

As is apparent from the above results, the ferroelectric liquid crystal device using the liquid crystal composition 3-B containing the mesomorphic compounds represented by the formula (I) showed an improved response time.

EXAMPLE 4

A liquid crystal composition 4-A was prepared by mixing the following compounds in respectively indicated proportions, with the liquid crystal composition 1-A prepared in Example 1.

| Structural formula | wt. parts |
|---|---|
| Compositoin 1-A | 82 |
| n-C$_3$H$_7$—⟨H⟩—CO—O—⟨⟩—OCH$_2$CHC$_8$H$_{17}$ (F*) | 2 |
| n-C$_6$H$_{13}$—⟨N⟩—⟨⟩—OCH$_2$CHC$_4$H$_9$-n (F*) | 2 |
| n-C$_8$H$_{17}$O—⟨⟩—CO—O—⟨⟩—OCH$_2$CHC$_8$H$_{17}$ (F*) | 2 |

-continued

| Structural formula | wt. parts |
|---|---|
| n-$C_7H_{15}$—[thiadiazole]—[phenyl]—$OC_{10}H_{21}$-n | 5 |
| n-$C_9H_{19}O$—[phenyl]—[thiadiazole]—[phenyl]—$OC_7H_{15}$-n | 4 |
| n-$C_7H_{15}$—[phenyl]—[thiadiazole]—[phenyl]—$C_7H_{15}$-n | 3 |

The liquid crystal composition 4-A was further mixed with the following Example Compounds in the proportions indicated below to provide a liquid crystal composition 4-B.

| Ex. Comp. No. | Structural formula | wt. parts |
|---|---|---|
|  | Composition 4-A | 93 |
| 5 | F—[phenyl]—CO-O—[phenyl]—[pyrimidine]—$C_9H_{19}$-n | 3 |
| 11 | CN—[phenyl]—CO-O—[phenyl]—[pyrimidine]—$C_{12}H_{25}$-n | 0.3 |
| 23 | $CF_3$—[phenyl]—CO-O—[phenyl]—[pyrimidine]—$C_{14}H_{29}$n | 2 |
| 37 | CN—[phenyl]—OC(=O)—[phenyl]—[pyrimidine]—$C_{16}H_{33}$n | 1 |
| 54 | F—[phenyl]—$CH_2$O—[phenyl]—[pyrimidine]—$C_5H_{11}$-n | 0.7 |

Ferroelectric liquid crystal devices were prepared in the same manner as in Example 1 except for using the compositions 4-A and 4-B. The ferroelectric liquid crystal devices were subjected to measurement of response time in the same manner as in Example 1, whereby the following results were obtained.

| Composition | Response time (μsec) | | |
|---|---|---|---|
|  | 10° C. | 25° C. | 40° C. |
| 4-A | 890 | 352 | 132 |
| 4-B | 670 | 264 | 102 |

As is apparent from the above results, the ferroelectric liquid crystal device using the liquid crystal composition 4-B containing the mesomorphic compounds represented by the formula (I) showed an improved response time.

EXAMPLE 5

A liquid crystal composition 5-A was prepared by mixing the following compounds in respectively indicated proportions with the liquid crystal composition 2-A prepared in Example 2.

| Structural formula | wt. parts |
|---|---|
| Composition 2-A | 82 |
| 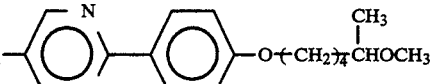 | 4 |
| 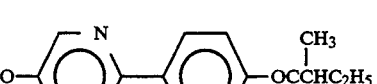 | 1 |
|  | 3 |
|  | 5 |
|  | 2 |
| 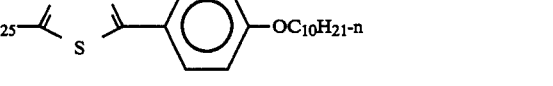 | 3 |

The liquid crystal composition 5-A was further mixed with the following Example Compounds in the proportions indicated below to provide a liquid crystal composition 5-B.

| Ex. Comp. No. | Structural formula | wt. parts |
|---|---|---|
| | Composition 5-A | 93 |
| 3 | F-⬡-CO-O-⬡-⬡(N,N)-C$_6$H$_{13}$-n | 2.8 |
| 4 | F-⬡-CO-O-⬡-⬡(N,N)-C$_{11}$H$_{23}$-n | 2.7 |
| 27 | NO$_2$-⬡-CO-O-⬡-⬡(N,N)-C$_{10}$H$_{21}$-n | 0.1 |
| 29 | NO$_2$-⬡-CO-O-⬡-⬡(N,N)-(CH$_2$)$_2$OC$_2$H$_5$ | 0.1 |
| 56 | F-⬡-CH$_2$O-⬡-⬡(N,N)-C$_{12}$H$_{25}$-n | 1 |

-continued

| Ex. Comp. No. | Structural formula | wt. parts |
|---|---|---|
| 116 |  | 0.3 |

Ferroelectric liquid crystal devices were prepared in the same manner as in Example 1 except for using the compositions 5-A and 5-B. The ferroelectric liquid crystal devices were subjected to measurement of response time in the same manner as in Example 1, whereby the following results were obtained.

| Composition | Response time (μsec) | | |
|---|---|---|---|
| | 10° C. | 25° C. | 40° C. |
| 5-A | 1116 | 370 | 147 |
| 5-B | 859 | 292 | 120 |

As is apparent from the above results, the ferroelectric liquid crystal device using the liquid crystal composition 5-B containing the mesomorphic compounds represented by the formula (I) showed an improved response time.

EXAMPLE 6

A liquid crystal composition 6-A was prepared by mixing the following compounds in respectively indicated proportions, with the liquid crystal composition 3-A prepared in Example 3.

| Structural formula | wt. parts |
|---|---|
| Compositoin 3-A | 82 |
| n-C$_8$H$_{17}$—⬡—[N=N pyrimidine]—⬡—O-(CH$_2$)$_3$CHC$_2$H$_5$ with CH$_3$ branch * | 3 |
| n-C$_5$H$_{11}$—H—CO-O—⬡—[N=N pyrimidine]—C$_{10}$H$_{21}$-n | 3 |
| n-C$_4$H$_9$—H—OC(=O)—⬡—⬡—OC$_{12}$H$_{25}$n | 2 |
| n-C$_6$H$_{13}$—[N-N/S thiadiazole]—⬡—OC$_8$H$_{17}$-n | 5 |
| n-C$_{12}$H$_{25}$—[N-N/S thiadiazole]—⬡—OC$_{10}$H$_{21}$-n | 2 |
| n-C$_{10}$H$_{21}$O—⬡—[N-N/S thiadiazole]—⬡—OCC$_{10}$H$_{21}$-n (=O) | 3 |

The liquid crystal composition 6-A was further mixed with the following Example Compounds in the proportions indicated below to provide a liquid crystal composition 6-B.

| Ex. Comp. No. | Structural formula | wt. parts |
|---|---|---|
| | Composition 6-A | 97 |
| 12 | 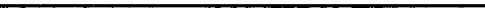 | 0.2 |

| Ex. Comp. No. | Structural formula | wt. parts |
|---|---|---|
| 18 | 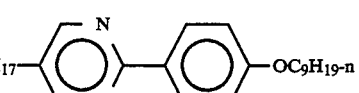 | 2 |
| 65 | 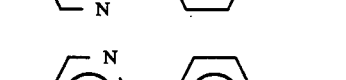 | 0.5 |
| 71 | 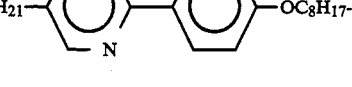 | 0.1 |
| 85 | 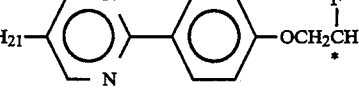 | 0.2 |

Ferroelectric liquid crystal devices were prepared in the same manner as in Example 1 except for using the compositions 6-A and 6-B. The ferroelectric liquid crystal devices were subjected to measurement of response time in the same manner as in Example 1, whereby the following results were obtained.

| | Response time ($\mu$sec) | | |
|---|---|---|---|
| Composition | 10° C. | 25° C. | 40° C. |
| 6-A | 884 | 307 | 130 |
| 6-B | 760 | 271 | 115 |

As is apparent from the above results, the ferroelectric liquid crystal device using the liquid crystal composition 6-B containing the mesomorphic compounds represented by the formula (I) showed an improved response time.

EXAMPLE 7

A liquid crystal composition 7-A was prepared by mixing the following compounds in respectively indicated proportions.

| Structural formula | wt. parts |
|---|---|
|  | 54.3 |

| Structural formula | wt. parts |
|---|---|
| n-$C_8H_{17}$—[pyrimidine]—[phenyl]—$OC_9H_{19}$-n | 27.1 |
| n-$C_{10}H_{21}$—[pyrimidine]—[phenyl]—$OC_8H_{17}$-n | 13.6 |
| n-$C_{10}H_{21}$—[pyrimidine]—[phenyl]—$OCH_2\overset{*}{C}HC_6H_{13}$ (F) | 2.5 |
| n-$C_{12}H_{25}$—[pyrimidine]—[phenyl]—$OCH_2\overset{*}{C}HC_6H_{13}$ (F) | 2.5 |

The liquid crystal composition 7-A was further mixed with the following Example Compounds in the proportions indicated below to provide a liquid crystal composition 7-B.

| Ex. Comp. No. | Structural formula | wt. parts |
|---|---|---|
| 1 | F—[phenyl]—CO—O—[phenyl]—[pyrimidine]—$C_{12}H_{25}$-n | 3 |
| 3 | F—[phenyl]—CO—O—[phenyl]—[pyrimidine]—$C_6H_{13}$-n | 2 |

| Ex. Comp. No. | Structural formula | wt. parts |
| --- | --- | --- |
| | Composition 7-A | 95 |

The above-prepared liquid crystal compositions 7-A and 7-B were used for providing liquid crystal devices in the following manner, respectively.

Two 1.1 mm-thick glass plates were provided and respectively coated with an ITO film to form an electrode for voltage application, which was further coated with an insulating layer of $Ta_2O_5$ by sputtering.

Further, each glass plate provided with an ITO film and treated in the above described manner was coated with a 1.0%-solution of polyimide resin precursor (LQ 1802, available from Hitachi Kasei K. K.) in N-methyl-2-pyrrolidone by a spinner coater. Thereafter, the coating film was subjected to heat curing at 270° C. for 60 min. The coating film was subjected to rubbing. After silica beads with an average particle size of 1.5 microns were dispersed on one of the glass plates, the two glass plates were applied to each other with a bonding sealing agent so that their rubbed directions were parallel to each other and heated at 100° C. for 60 min. to form a blank cell.

Then, each of the liquid crystal compositions 7-A and 7-B prepared above was heated into an isotropic liquid, and injected into the above prepared cell under vacuum and, after sealing, was gradually cooled at a rate of 20° C./hour to 30° C. to prepare a ferroelectric liquid crystal device. The pre-tilt angle was 12 degrees.

The above-prepared type liquid crystal devices were respectively subjected to observation of the alignment state in the cell by means of a polarizing microscope at 30° C. under cross nicols. The liquid crystal device using the liquid crystal composition 7-A showed an entire C1 alignment domain comprising two splay orientation states (area ratio of 80%) and two uniform orientation states (area ratio of 20%). On the other hand, the liquid crystal device using the liquid crystal composition 7-B showed an entire C1 alignment domain comprising only two uniform states.

Figure 7:
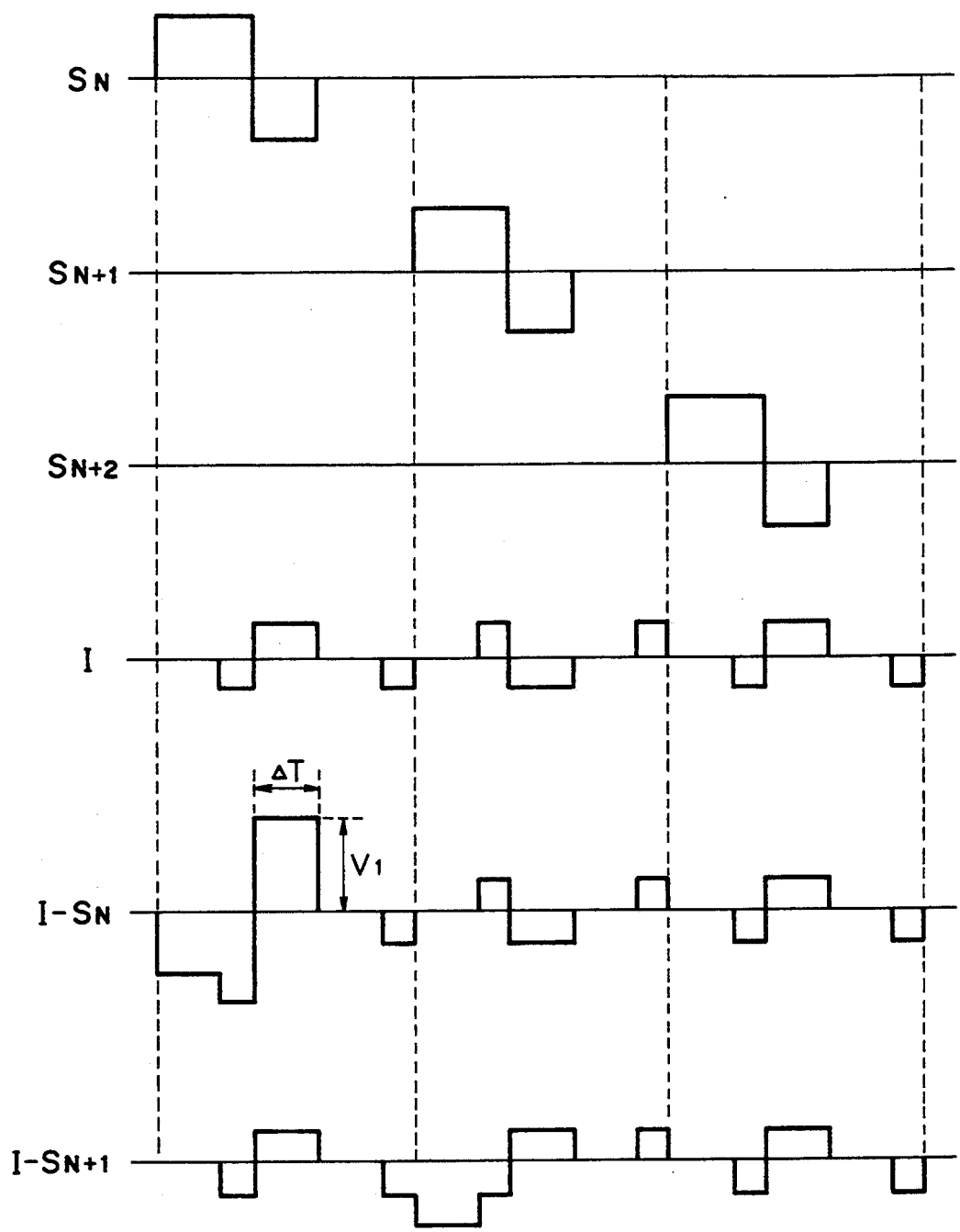
FIG. 7 is a time chart showing a set of drive voltage waveforms for measuring a drive margin in a matrix drive system.

Then, the two liquid crystal devices were respectively driven by applying a set of driving waveforms shown in FIG. 7 and by disposing polarizers so as to display "white" at a pixel $I-S_N$, and "black" at a pixel $I-S_{N+1}$.

Referring to FIG. 7, at $S_N$, $S_{N+1}$ ... are shown voltage waveforms applied to the respective scanning electrodes $S_N$, $S_{N+1}$ ... ; at I is shown a voltage waveform applied to a data electrode I; and at $I-S_N$, etc. are shown voltage waveforms applied to pixel formed at the respective intersections of the scanning electrodes $S_N$ ... and the data electrode I.

In the device using the composition 7-A, a poor transition from one uniform state to another uniform state occurred, and the splay alignment states and the uniform alignment states occurred in mixture. As a result, the device was driven only in a narrow range with a pulse width $\Delta T$ of 90–95 μsec while providing any one of the two uniform states (herein, a range of $\Delta T$ capable of displaying any one of "white" and "black" as desired in the uniform alignment is referred to as "drive margin"). On the other hand, in the device using the composition 7-B, a wide drive margin with $\Delta T$ of 65–120 μsec was obtained.

When measurement of contrast ratios at $\Delta T=92$ μsec with the two devices using the compositions 7-A and 7-B was conducted, the device using the composition 7-A provided a contrast ratio of 23:1 and the device using the composition 7-B provided a contrast ratio of 50:1.

Further, measurement of drive margins with the two devices using the compositions 7-A and 7-B was conducted at 30° C. after the devices had been left standing for 72 hours at 30° C. respectively in a state of display "white". As a result, the device using the composition 7-A failed to display "black" and lost its drive margin. On the other hand, the device using the composition 7-B could be driven in the same range of $\Delta T$ as that before the standing.

As is understood from the above results, the liquid crystal composition 7-B containing the mesomorphic compounds of the formula (I) according to the present invention in combination with the alignment film "LQ 1802" (available from Hitachi Kasei K. K.) providing a high pre-tilt angle provided remarkably improved switching characteristics and contrast and further little tendency of standing monostabilization to obtain high quality images.

EXAMPLE 8

A liquid crystal composition 1-A was prepared by mixing the following compounds in respectively indicated proportions.

| Structural formula | wt. parts |
| --- | --- |
| $n\text{-}C_8H_{17}$—[pyrimidine]—[phenyl]—$OC_6H_{13}\text{-}n$ | 50.9 |
| $n\text{-}C_8H_{17}$—[pyrimidine]—[phenyl]—$OC_9H_{19}\text{-}n$ | 25.4 |
| $n\text{-}C_{10}H_{21}$—[pyrimidine]—[phenyl]—$OC_8H_{17}\text{-}n$ | 12.7 |

| Structural formula | wt. parts |
|---|---|
| 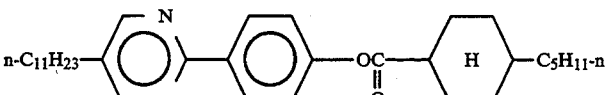 | 3 |
| 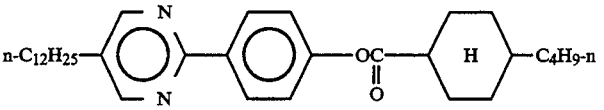 | 3 |
| 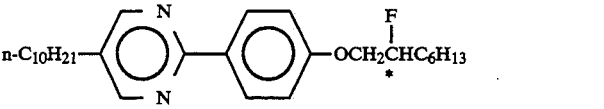 | 2.5 |
| 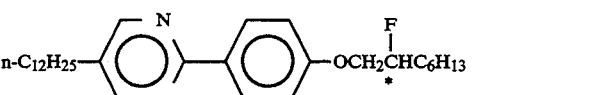 | 2.5 |

The liquid crystal composition 8-A was further mixed with the following Example Compounds in the proportions indicated below to provide a liquid crystal composition 8-B.

| Ex. Comp. No. | Structural formula | wt. parts |
|---|---|---|
| 22 | 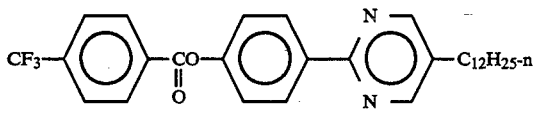 | 2 |
| 23 | 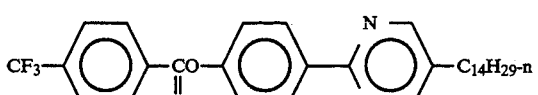 | 1 |
| 6 | 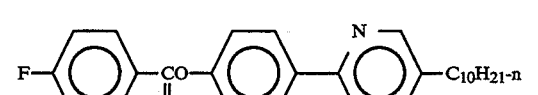 | 2 |
| | Composition 8-A | 95 |

Ferroelectric liquid crystal devices were prepared in the same manner as in Example 7 except that the above liquid crystal compositions 8-A and 8-B were used.

The above-prepared two liquid crystal devices were respectively subjected to observation of the alignment state in the cell by means of a polarizing microscope at 30° C. The liquid crystal device using the liquid crystal composition 8-A showed an entire C1 alignment domain comprising two splay orientation states. On the other hand, the liquid crystal device using the liquid crystal composition 8-B showed an entire C1 alignment domain comprising only two uniform states.

Then, the two liquid crystal devices were respectively driven by applying the same set of driving waveforms as that in Example 7.

In the device using the composition 8-A, a drive margin providing the above-mentioned two uniform states was not obtained. On the other hand, in the device using the composition 8-B, a wide drive margin with $\Delta T$ of 78–160 $\mu$sec was obtained.

When measurement of a contrast ratio at $\Delta T=120$ $\mu$sec with the device using the composition 8-B was conducted, a contrast ratio of 47:1 was obtained.

When the standing monostabilization with the device using the composition 8-B was tested in the same manner as in Example 7, the device could be driven in the same range of $\Delta T$ as that before the standing.

As is understood from the above results, the liquid crystal composition 8-B containing the mesomorphic compounds of the formula (I) according to the present invention in combination with the alignment film "LQ 1802" (available from Hitachi Kasei K. K.) providing a high pre-tilt angle provided remarkably improved switching characteristics and contrast and further little tendency of standing monostabilization to obtain high quality images.

As described hereinabove, according to the present invention, there is provided a liquid crystal composition assuming a chiral smectic phase for effectively providing a liquid crystal device utilizing ferroelectricity of the composition. The present invention further provides a liquid crystal device using such a composition which shows a good switching characteristic, an improved low-temperature operation characteristic and a decreased temperature-dependence of response speed. The liquid crystal composition of the present invention can be used in combination with an alignment film providing a high pre-tilt angle, whereby a liquid crystal device capable of providing a high contrast image with a high transmittance, decreased standing monostabilization and good switching properties, may be provided. The present invention further provides a display apparatus and a display method which employ such a device as a display unit, whereby good display characteristics can be obtained in combination with a light source, a drive circuit, etc.

What is claimed is:

1. A chiral smectic liquid crystal composition comprising at least one species of optically inactive mesomorphic compound represented by the following formula (I):

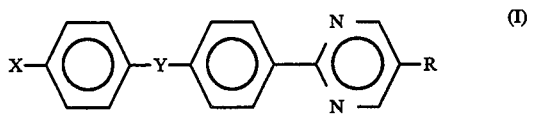

wherein X denotes F, Cl, Br, CF$_3$, NO$_2$, or CN; Y denotes

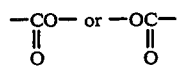

and R denotes a linear or branched alkyl group having 1–20 carbon atoms or —(CH$_2$)$_2$R$_1$, wherein R$_1$ is a linear alkoxy group having 2–10 carbon atoms.

2. A chiral smectic liquid crystal composition according to claim 1, wherein contains 1–80 wt. % of a mesomorphic compound of the formula (I).

3. A chiral smectic liquid crystal composition according to claim 1, which contains 1–60 wt. % of a mesomorphic compound of the formula (I).

4. A chiral smectic liquid crystal composition according to claim 1, which contains 1–40 wt. % of a mesomorphic compound of the formula (I).

5. A liquid crystal device, comprising:

a liquid crystal layer of a chiral smectic liquid crystal composition comprising at least one species of optically inactive mesomorphic compound represented by the following formula (I):

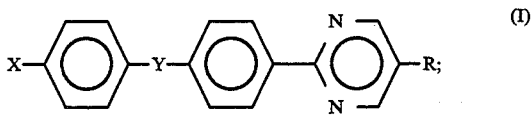

wherein X denotes F, Cl, Br, CF$_3$, NO$_2$ or CN; Y denotes

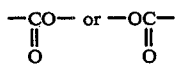

and R denotes a linear or branched alkyl group having 1–20 carbon atoms, or —(CH$_2$)$_2$R$_1$, wherein R$_1$ is a linear alkoxy group having 2–10 carbon atoms; and a pair of electrode plates sandwiching the liquid crystal layer for applying a voltage across the liquid crystal layer so as to select an orientation state of the chiral smectic liquid crystal composition based on the polarity of the voltage.

6. A chiral smectic liquid crystal device according to claim 5, wherein the mesomorphic compound of the formula (I) is represented by any of the following formulas:

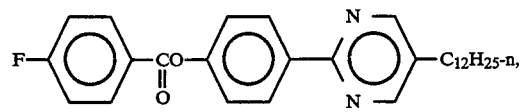

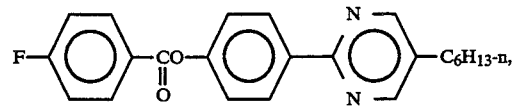

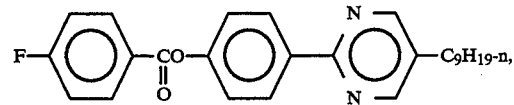

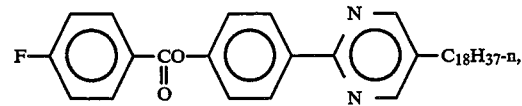

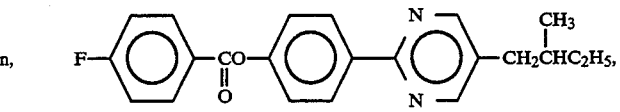

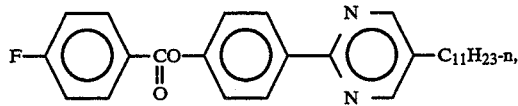

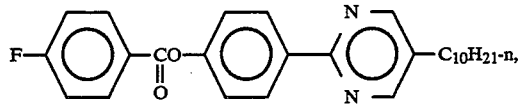

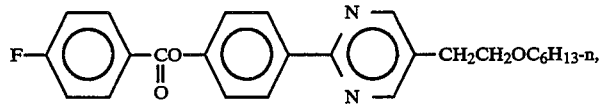

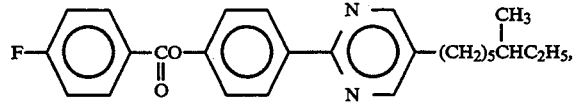

-continued
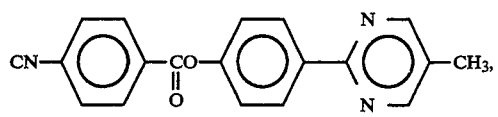 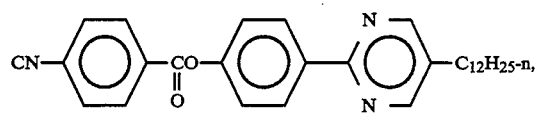
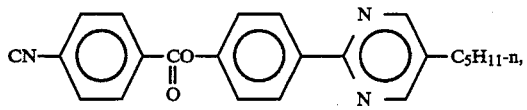
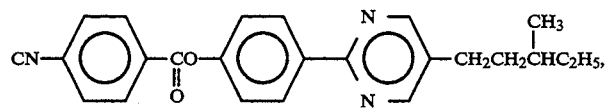
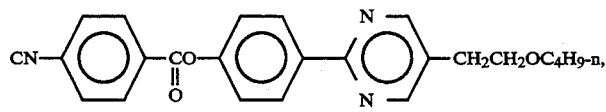
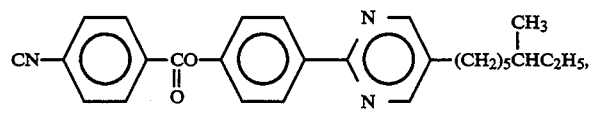
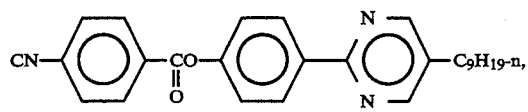 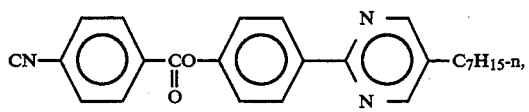
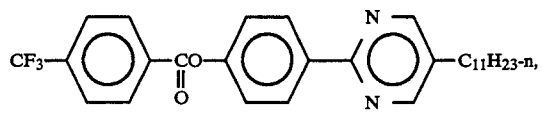 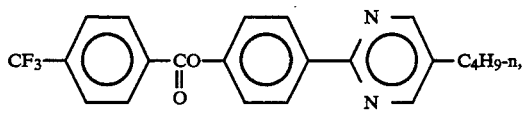
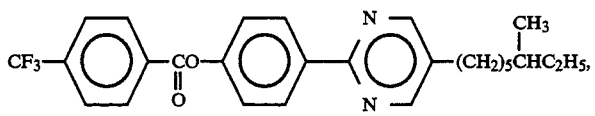
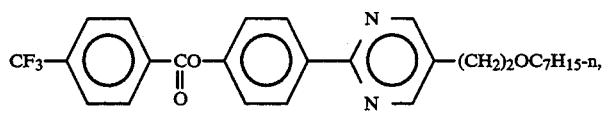
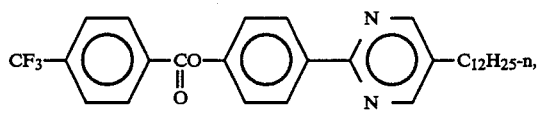 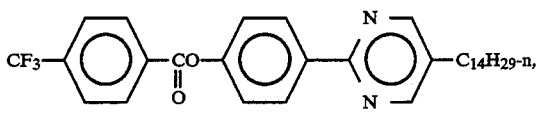
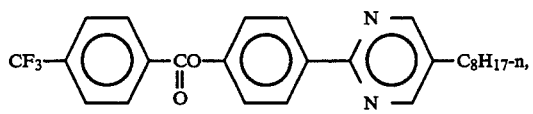 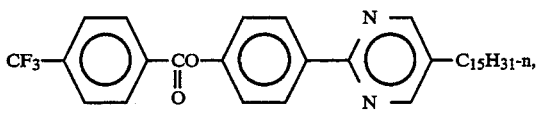
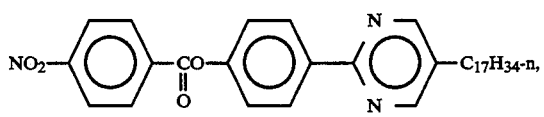 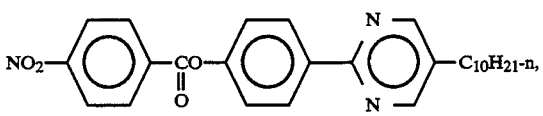
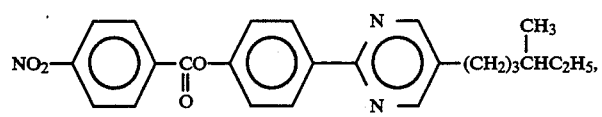

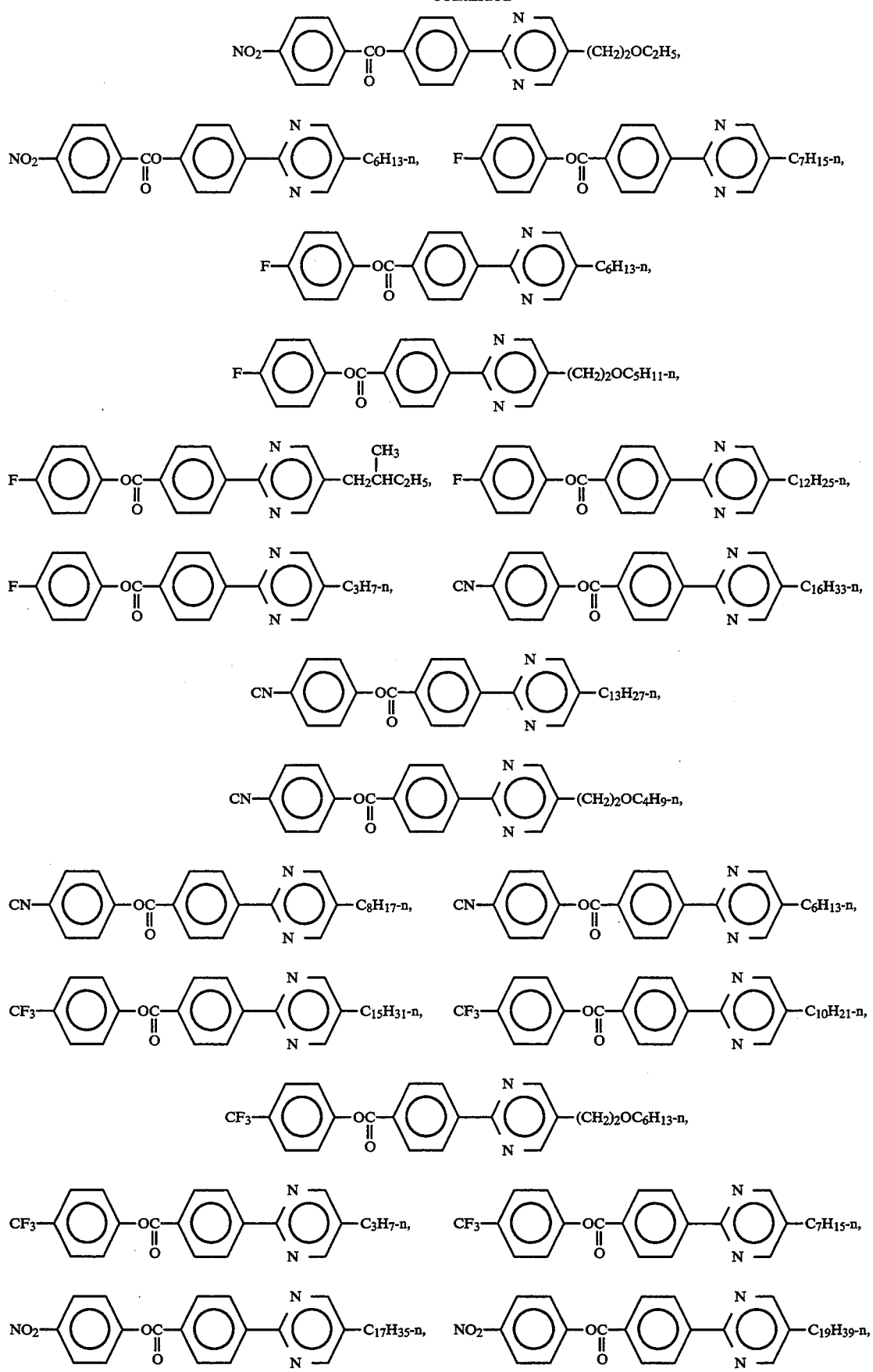

-continued

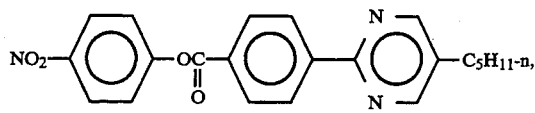
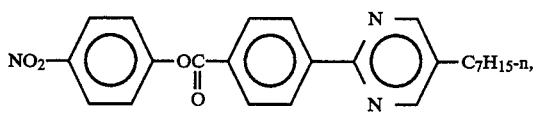
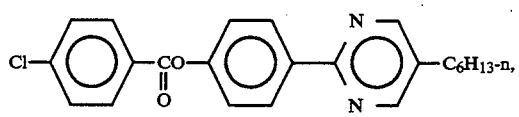
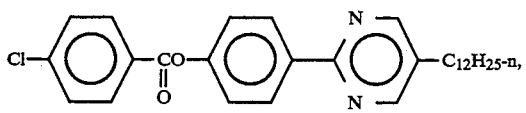
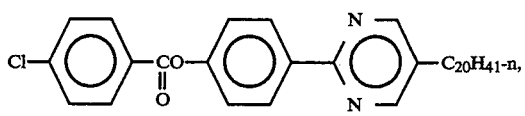
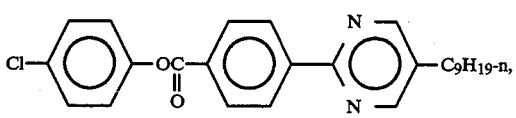
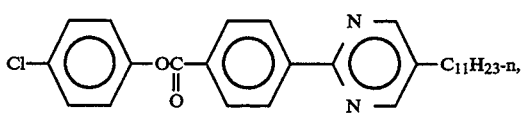
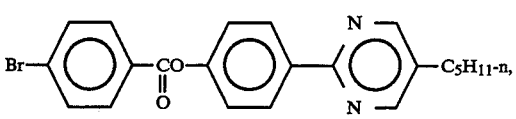
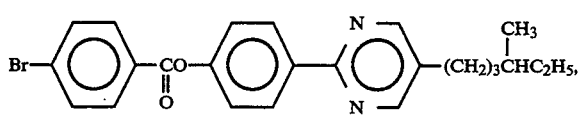
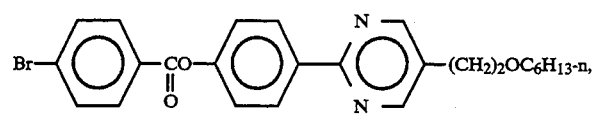
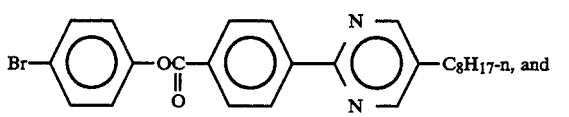
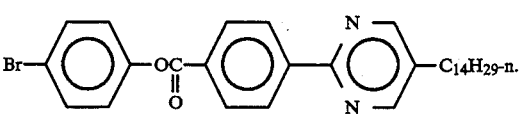

7. A liquid crystal device according to claim 5, further comprising an insulating alignment control layer.

8. A liquid crystal device according to claim 7, wherein the insulating alignment control layer has been subjected to rubbing.

9. A liquid crystal device according to claim 7, wherein the insulating alignment control layer is one capable of causing a C1 alignment domain of liquid crystal molecules in a uniform state.

10. A liquid crystal device according to claim 9, wherein the insulating alignment control layer is one providing the liquid crystal with a pre-tilt angle of at least 6 degrees.

11. A display apparatus comprising a liquid crystal device according to claim 5, and voltage application means for driving the liquid crystal device.

12. A display apparatus comprising a liquid crystal device according to claim 6, and voltage application means for driving the liquid crystal device.

13. A display apparatus according to claim 11, which further comprises a drive circuit.

14. A display apparatus according to claim 11, which further comprises a light source.

15. A chiral smectic liquid crystal composition according to claim 1, wherein the mesomorphic compound of the formula (I) is represented by any of the following formulas:

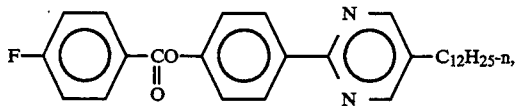
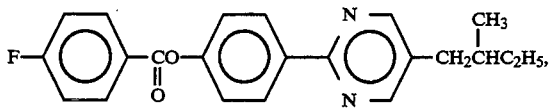
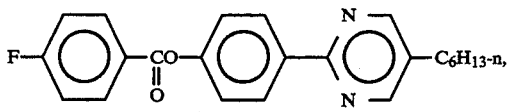
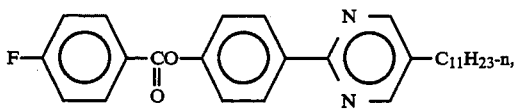
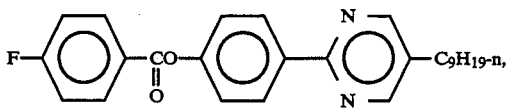
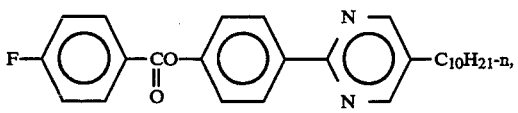

-continued
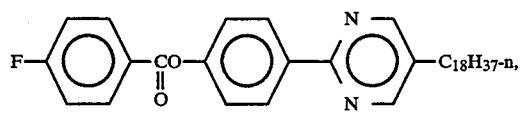
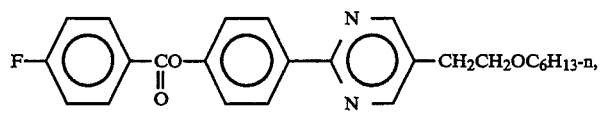
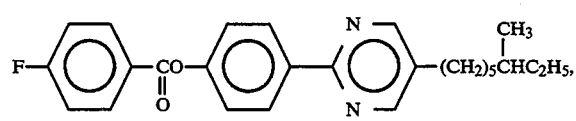
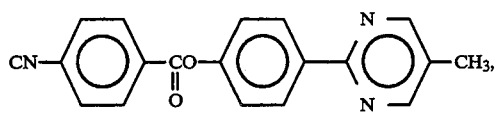
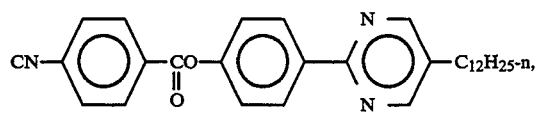
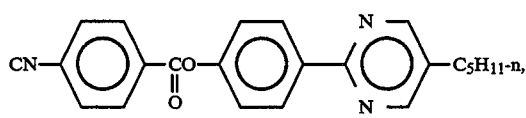
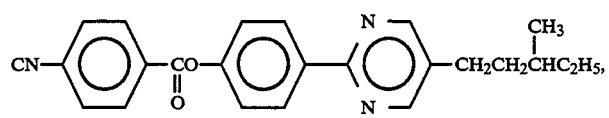
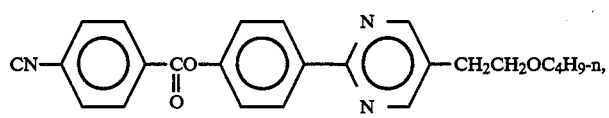
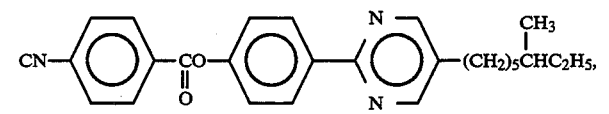
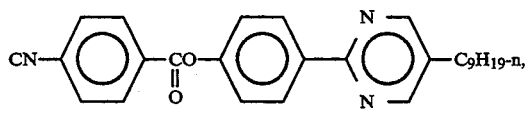
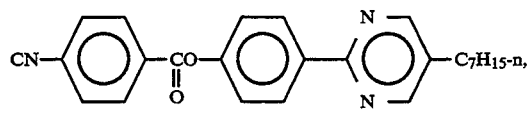
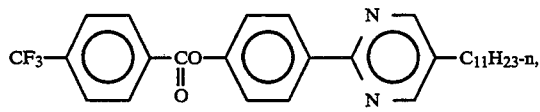
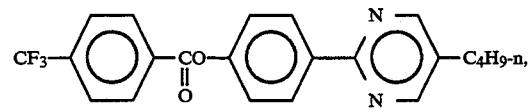
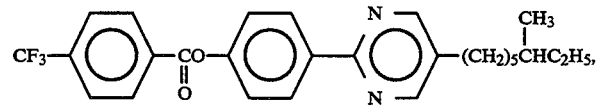
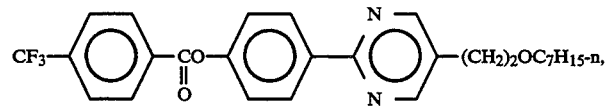
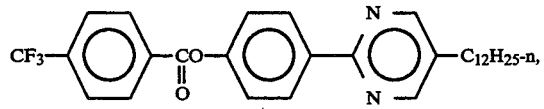
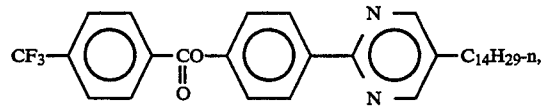

-continued
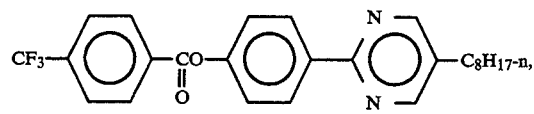
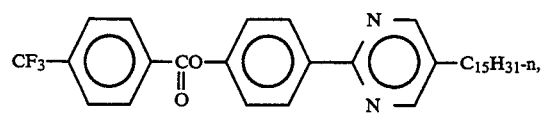
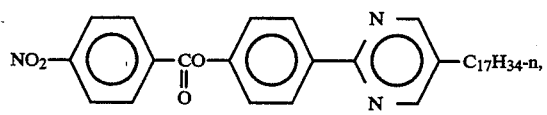
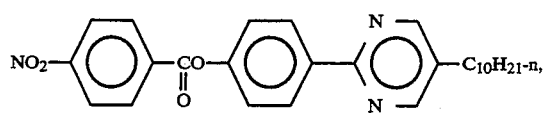
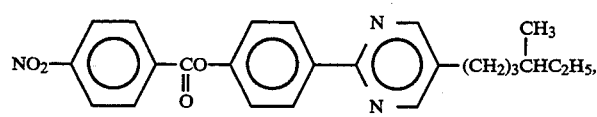
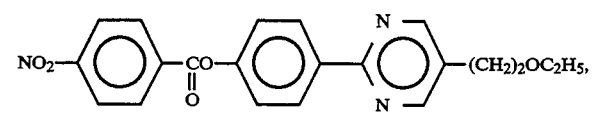
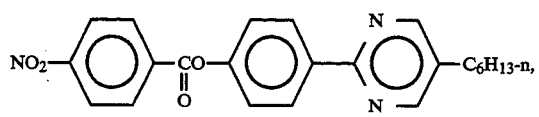
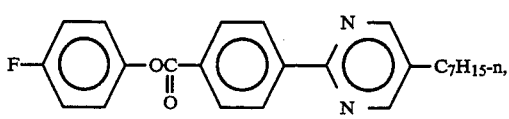
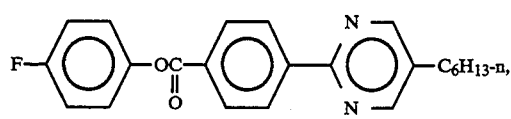
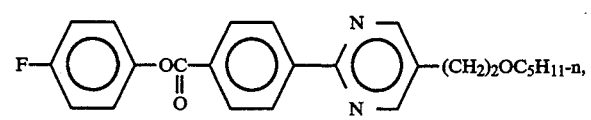
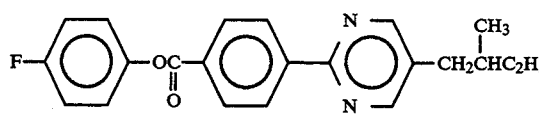
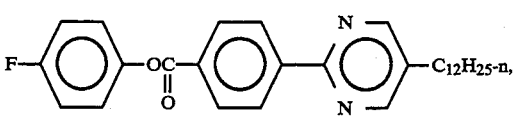
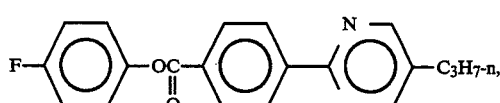
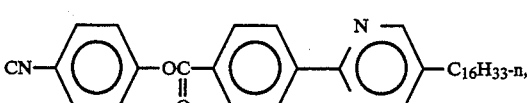
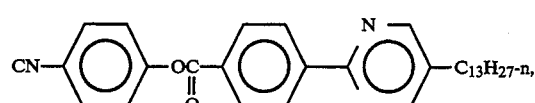
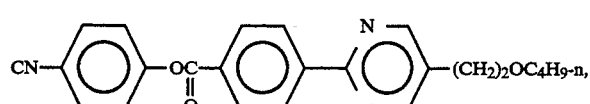
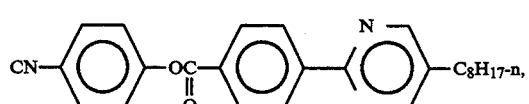
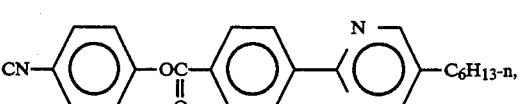
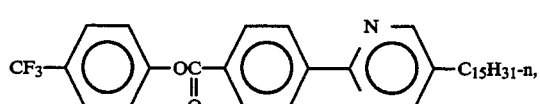
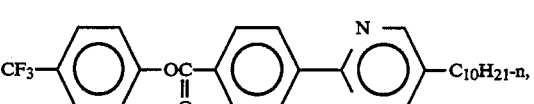

-continued

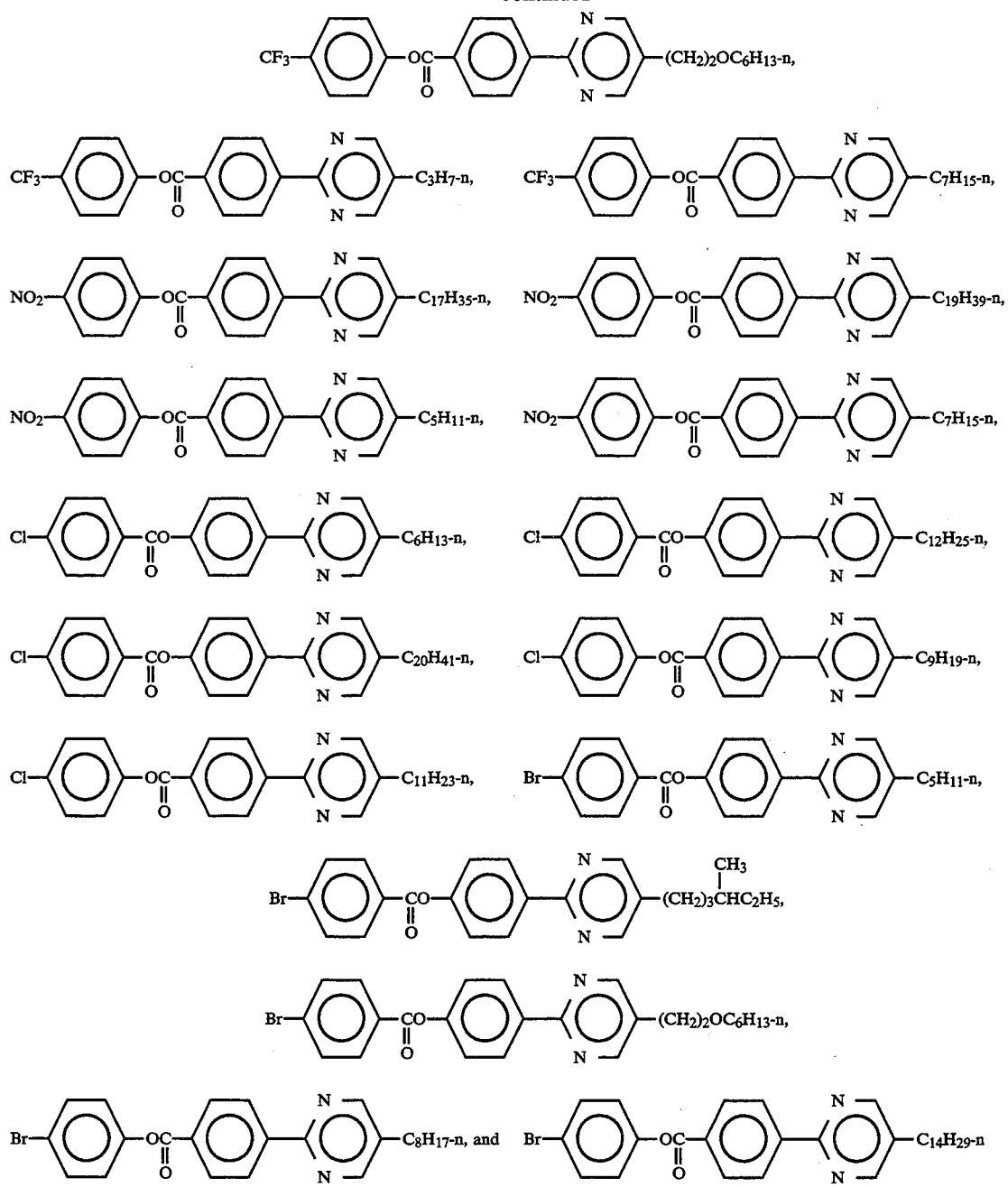

16. A display method, comprising;
providing a liquid crystal device according to claim 5; and
switching orientation states of the liquid crystal by voltage application to effect display.

17. A display method according to claim 16, wherein the chiral smectic liquid crystal composition comprises 1–80 wt. % of a mesomorphic compound of the formula (I).

18. A display method according to claim 16, wherein the chiral smectic liquid crystal composition comprises 1–60 wt. % of a mesomorphic compound of the formula (I).

19. A display method according to claim 16, wherein the chiral smectic liquid crystal composition comprises 1–40 wt. % of a mesomorphic compound of the formula (I).

* * * * *

UNITED STATES PATENT AND TRADEMARK OFFICE
CERTIFICATE OF CORRECTION

PATENT NO. : 5,424,004
DATED : June 13, 1995
INVENTOR(S) : KENJI SHINJO, ET AL

It is certified that error appears in the above-indentified patent and that said Letters Patent is hereby corrected as shown below:

On the title page, item
[56] References Cited

"144423  10/1980 Germany" should read --144423  10/1980 DDR--; and

"3196685  8/1988 Japan" should read --63-196685  8/1988 Japan--.

COLUMN 1

Line 11, "a" (second occurrence) should be deleted;

Line 12, "composition" should read --composition,--; and

Line 52, "so called" should read --so-called--.

COLUMN 2

Line 11, "has" should read --have--;

Line 12, "any method is not" should read --no method is--; and

Line 35, "electric" should read --electric field--.

COLUMN 3

Line 35, "An:" should read --$\Delta$n:--; and

Line 37, "i"" should read --$\lambda$:--.

COLUMN 5

Line 63, "forming" should read --form--.

UNITED STATES PATENT AND TRADEMARK OFFICE
CERTIFICATE OF CORRECTION

PATENT NO. : 5,424,004

DATED : June 13, 1995

INVENTOR(S) : KENJI SHINJO, ET AL

It is certified that error appears in the above-indentified patent and that said Letters Patent is hereby corrected as shown below:

COLUMN 6

Line 10, "cannot" should read --can--.

COLUMN 22

Line 66, "or" should read --or $-OCO-$;--
$$-O\overset{\overset{O}{\|}}{C}O-$$

COLUMN 36

Line 15, "denote" should read --denotes--.

COLUMN 39

Line 13, "-C-, -OC-, -CO-," should be deleted.

COLUMN 40

Line 15, "-O-" should read -- -O- --.

COLUMN 54

Line 53, "Compositoin 1-A" should read --Composition 1-A--.

COLUMN 60

Line 25, "Compositoin 3-A" should read --Composition 3-A--.

UNITED STATES PATENT AND TRADEMARK OFFICE
CERTIFICATE OF CORRECTION

PATENT NO. : 5,424,004
DATED : June 13, 1995
INVENTOR(S) : KENJI SHINJO, ET AL

It is certified that error appears in the above-indentified patent and that said Letters Patent is hereby corrected as shown below:

<u>COLUMN 67</u>

Line 38, "wherein" should read --which--.

Signed and Sealed this

Twentieth Day of February, 1996

Attest:

BRUCE LEHMAN

Attesting Officer

Commissioner of Patents and Trademarks